US012754953B2

(12) United States Patent
Jung et al.

(10) Patent No.: US 12,754,953 B2
(45) Date of Patent: Oct. 6, 2026

(54) ARTIFICIAL INTELLIGENCE DEVICE FOR PROVIDING USER-PERSONALIZED CONTENT, AND METHOD FOR CONTROLLING SAME DEVICE

(71) Applicant: LG ELECTRONICS INC., Seoul (KR)

(72) Inventors: Sungwon Jung, Seoul (KR); Jingu Choi, Seoul (KR); Kyungseok Oh, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 75 days.

(21) Appl. No.: 18/698,935

(22) PCT Filed: Oct. 6, 2021

(86) PCT No.: PCT/KR2021/013719
§ 371 (c)(1),
(2) Date: Apr. 5, 2024

(87) PCT Pub. No.: WO2023/058789
PCT Pub. Date: Apr. 13, 2023

(65) Prior Publication Data
US 2024/0403358 A1 Dec. 5, 2024

(51) Int. Cl.
*G06F 16/635* (2019.01)
*G06F 3/01* (2006.01)

(52) U.S. Cl.
CPC ............ *G06F 16/636* (2019.01); *G06F 3/011* (2013.01); *G06F 2203/011* (2013.01)

(58) Field of Classification Search
CPC .. G06F 16/636; G06F 3/011; G06F 2203/011; G06F 3/162; G06F 3/165; G06F 3/167
See application file for complete search history.

(56) References Cited

FOREIGN PATENT DOCUMENTS

KR 10-2018-0015586 A * 2/2018
KR 10-2018-0036163 A 4/2018
(Continued)

*Primary Examiner* — Vivian C Chin
(74) *Attorney, Agent, or Firm* — Birch, Stewart, Kolasch & Birch, LLP

(57) ABSTRACT

The present invention relates to an artificial intelligence device for providing a user-personalized content on the basis of a user situation estimated from a surrounding environment, the device comprising: a communicator for making a communication connection to at least one biometric information collecting device for collecting biometric information of a user and a content source; an artificial intelligence part for estimating a user situation on the basis of the collected biometric information, detecting effect of an acoustic environment around the user on a biometric signal of the user according to a change in the collected biometric information, and learning a user-personalized acoustic characteristic corresponding to the estimated user situation on the basis of the detected effect and the estimated user situation; and a controller for retrieving at least one content in the content source on the basis of the user-personalized acoustic characteristic according to a learning result of the artificial intelligence part, and controlling the communicator and an output device connected through the communicator so that the output device is able to output an acoustic signal of the retrieved content.

19 Claims, 9 Drawing Sheets

(56) References Cited

FOREIGN PATENT DOCUMENTS

| | | | |
|---|---|---|---|
| KR | 10-2018-0063163 | A | 6/2018 |
| KR | 10-2021-0073145 | A | 6/2021 |

* cited by examiner

ARTIFICIAL INTELLIGENCE DEVICE FOR PROVIDING USER-PERSONALIZED CONTENT, AND METHOD FOR CONTROLLING SAME DEVICE

CROSS-REFERENCE TO RELATED APPLICATIONS

This application is the National Phase of PCT International Application No. PCT/KR2021/013719 filed on Oct. 6, 2021, the disclosure of which is incorporated herein by reference in its entirety.

TECHNICAL FIELD

The present disclosure relates to an artificial intelligence device that provides user-personalized content based on a user situation estimated from a surrounding environment, and a method of controlling the same.

BACKGROUND ART

In the case of work, study, or meditation, it is widely known that listening to music together rather than silence can improve work or study efficiency and increase concentration. Furthermore, it is widely known that exercising while listening to fast and exciting music can improve the effectiveness of exercise through uplifting a user's mood than otherwise.

In general, in cases where the user's emotional stability is required, such as in work, study, or meditation, for music that helps improve efficiency through listening together, classical music or piano melody music, low fidelity (lo-fi) genre music having a certain frequency spectrum by mixing ambient noise or white noise with the music, ambient music having a melodic structure that is repetitive and emotionally comforting by mixing natural sounds such as a sound of water droplets or a sound of wind, or the like is mainly used. In addition, in the case of exercise or the like, fast-paced dance songs, pop or rock genre music, and the like are used to uplift the user's mood.

However, there are large differences between individuals as to which music is more effective for each user to listen to in which situations. As a result, there is a problem in that it is difficult to know which characteristics of music are more suitable for oneself and his or her current situation.

Therefore, when listening to music while working, studying, or exercising, it is common for the user to select music that is widely known to be effective for the user's situation or music recommended by others, or to select music that the user randomly selects according to his or her own tastes.

However, selecting music without knowing exactly what characteristics are suitable for oneself can lower his or her efficiency or concentration, or reduce its effectiveness compared to not listening to music due to large individual differences. Accordingly, there are growing needs among users for user-personalized content that can create an environment capable of maximizing learning, work efficiency, or exercise effectiveness under various user's situations such as work, study, or exercise.

DISCLOSURE OF INVENTION

Technical Problem

The present disclosure aims to solve the above-described problems and other problems, and an aspect of the present disclosure is to provide an artificial intelligence device that detects the characteristics of content that is effective in improving efficiency or increasing effectiveness according to a user's personal characteristics in each situation, and retrieves and provides content according to the detected characteristics, and a method of controlling the same.

In addition, an aspect of the present disclosure is to provide an artificial intelligence device capable of further increasing, when a plurality of artificial intelligence devices collaborate for a service that provides user-personalized content, the artificial intelligence algorithm processing efficiency of each device, and further reducing the artificial intelligence algorithm processing time of each device, and a method of controlling the same.

Solution to Problem

In order to achieve the foregoing and other objectives, according to an aspect of the present disclosure, an artificial intelligence device according to an embodiment of the present disclosure can include a communicator that performs a communication connection with a content source and at least one biometric information collection device that collects a user's biometric information, an artificial intelligence part that estimates the user's situation based on the collected biometric information, detects an effect of an acoustic environment around the user on the user's biometric signal according to a change in the collected biometric information, and learns a user-personalized acoustic characteristic corresponding to the estimated user situation based on the detected effect and the estimated user situation, and a controller that retrieves at least one content item from the content source based on the user-personalized acoustic characteristic according to a learning result of the artificial intelligence part, and controls the communicator and an output device to output an acoustic signal of the retrieved content from the output device connected through the communicator.

In one embodiment, the communicator can further perform a communication connection with at least one acoustic information collection device that collects acoustic information from around the user, wherein the controller estimates the user's situation based on at least one of the collected biometric information and the collected acoustic information, and detects the effect of the acoustic environment around the user on the user's biometric signal based on at least one of the acoustic signal of the content output from the output device and the collected acoustic information.

In one embodiment, the acoustic environment around the user can be formed by at least one of an acoustic signal of content output from the output device and a noise due to a natural object around the user.

In one embodiment, the artificial intelligence part can determine whether the acoustic environment around the user has a positive or negative effect on the user, depending on whether a change in the biometric information on the acoustic environment around the user matches a currently estimated situation of the user, and reflect an acoustic characteristic detected from the collected acoustic information according to the determined result to learn the user-personalized acoustic characteristic.

In one embodiment, the artificial intelligence part can distinguish whether the acoustic environment around the user affects the user when the change in the biometric information is greater than the change in the user biometric information previously learned for the estimated user's situation.

In one embodiment, the artificial intelligence device can further include a content composition part that generates composite content by combining a plurality of partial content items extracted from a plurality of content items, wherein the controller retrieves the plurality of content items that match at least one user-personalized acoustic characteristic learned from the content source, generates the plurality of partial content items by extracting portions that match the learned at least one user-personalized acoustic characteristic for the retrieved content items, respectively, and controls the content composition part to generate the composite content by combining the generated plurality of partial content items.

In one embodiment, the controller can modify at least some of the plurality of partial content items according to the learned at least one user-personalized acoustic characteristic, and control the content composition part to generate composite content including the modified content items.

In one embodiment, the controller can receive, when there are a plurality of devices collecting specific biometric information from among the biometric information collection devices, the specific biometric information from any one of the plurality of devices based on a preset condition, wherein the preset condition is at least one of the estimated user's situation and a biometric information collection accuracy of the device collecting biometric information.

In one embodiment, the acoustic information collection device can include a mobile device that moves with the user's movement or a fixed device that is fixedly placed in a specific place, wherein the controller estimates, when the acoustic information collection device connected through the communicator or configured to transmit the collected acoustic information is the fixed device, the user's situation based on the place in which the fixed device is placed.

In one embodiment, the communicator can perform a communication connection with at least one biometric information collection device or at least one acoustic information collection device in a low-power Bluetooth mode.

In one embodiment, the controller can retrieve, prior to receiving the collected biometric information or the collected acoustic information through the communicator, a device to which an artificial intelligence algorithm is applied from among the at least one biometric information collection device and the at least one acoustic information collection device, and exchange data related to artificial intelligence algorithm processing applied to each of the artificial intelligence devices with the retrieved device, wherein the data exchanged between the retrieved device and the artificial intelligence device includes information related to the artificial intelligence algorithm applied to each of the retrieved device and the artificial intelligence devices, and information related to variables required for processing an artificial intelligence algorithm applied to each of the retrieved device and the artificial intelligence device.

In one embodiment, the information related to the variables can include information on the variables and a processing time that can be processed by an artificial intelligence algorithm applied to each device for each of the variables, wherein the controller determines a processing entity for the exchanged variables based on information related to the variables.

In one embodiment, the data exchanged between the artificial intelligence device and each of the retrieved devices can include service authority information on an authority to use data provided by any one device to another device.

In order to achieve the foregoing and other objectives, according to an aspect of the present disclosure, there is provided a method of controlling an artificial intelligence device that is communicably connected between a content source and at least one biometric information collection device, the method including a step 1 of collecting a user's biometric information from the at least one biometric information collection device, a step 2 of estimating the user's situation based on the collected user's biometric information, a step 3 of retrieving content that matches a user-personalized acoustic characteristic previously learned for the estimated user situation from the content source, a step 4 of outputting an acoustic signal of the retrieved content through an output device connected to the artificial intelligence device, a step 5 of detecting an effect of an acoustic environment around the user on the user's biometric signal according to a change in the collected user's biometric information, a step 6 of determining whether the acoustic environment around the user has a positive or negative effect on the user, depending on whether a change in the user's biometric information matches the estimated user's situation, a step 7 of learning the user-personalized acoustic characteristic by reflecting an acoustic characteristic of the output content according to a result of determining the effect of the acoustic environment around the user on the user, a step 8 of retrieving content having the same acoustic characteristic as or content having a different characteristic from that of the output content from the content source according to a result of determining the effect of the acoustic environment around the user on the user, and a step 9 of repeating a process from the step 4 to the step 8 of outputting an acoustic signal of the retrieved content.

In one embodiment, the step 7 can include a step 7-1 of collecting acoustic information from at least one acoustic information collection device that collects acoustic information from around the user, a step 7-2 of analyzing at least one acoustic characteristic that is common to the collected at least one acoustic information, and a step 7-3 of determining the effect of the acoustic environment around the user on the user according to a change in the user's biometric information, and reflecting the acoustic characteristic analyzed in the step 7-2 according to a result of the determination to learn the user-personalized content.

In one embodiment, the step 1 can include a step 1-1 of retrieving a device to which an artificial intelligence algorithm is applied from among at least one biometric information collection device, a step 1-2 of exchanging data related to artificial intelligence algorithm processing applied to each of the artificial intelligence devices with the retrieved device, a step 1-3 of acquiring information including variables required for processing the artificial intelligence algorithm applied to the retrieved device and variable processing times corresponding to processing times that can be processed by the retrieved device for each of the variables based on the exchanged data, and determining a processing entity for each of the variables based on the acquired information, a step 1-4 of processing variables to be processed by the artificial intelligence device, based on the processing entity for each variable determined in the step 1-3, and providing variable information on the processed variables to the retrieved device, and a step 1-5 of collecting, by the retrieved device, the user's biometric information based on an artificial intelligence algorithm according to the variable information, and transmitting the collected biometric information to the artificial intelligence device.

In one embodiment, the step 1-3 can include a step (a) of detecting variables that can be processed by the artificial intelligence device from among variables required for processing the artificial intelligence algorithm applied to the retrieved device, a step (b) of calculating an expected processing time that can be processed by the artificial intelligence device for each of the variables detected in the step (a), and a step (c) of comparing the variable processing time corresponding to each of the variables detected in the step (a) with the expected processing time to determine a processing entity so as to process each of the variables detected in the step (a).

Advantageous Effects of Invention

An artificial intelligence device and a method of controlling the same according to the present disclosure will be described as follows.

According to at least one of the embodiments of the present disclosure, the present disclosure can provide content that is effective in improving efficiency or increasing effectiveness according to a user's personal characteristics in each situation, thereby creating a user environment capable of maximizing its effectiveness.

In addition, the present disclosure can perform distributed processing on variables according to the computing power of each device to which an artificial intelligence algorithm is applied, thereby having an effect of increasing the processing efficiency of the artificial intelligence algorithm for the user-personalized content providing service and further reducing the processing time.

MODE FOR THE INVENTION

It should be noted that technical terms used herein are merely used to describe specific embodiments, and are not intended to limit the present disclosure. Furthermore, a singular expression used herein includes a plural expression unless it is clearly construed in a different way in the context. A suffix "module" or "unit" used for elements disclosed in the following description is merely intended for easy description of the specification, and the suffix itself is not intended to have any special meaning or function.

As used herein, terms such as "comprise" or "include" should not be construed to necessarily include all elements or steps described herein, and should be construed not to include some elements or some steps thereof, or should be construed to further include additional elements or steps.

In addition, in describing technologies disclosed herein, when it is determined that a detailed description of known technologies related thereto can unnecessarily obscure the subject matter disclosed herein, the detailed description will be omitted.

Furthermore, the accompanying drawings are provided only for a better understanding of the embodiments disclosed herein and are not intended to limit technical concepts disclosed herein, and therefore, it should be understood that the accompanying drawings include all modifications, equivalents and substitutes within the concept and technical scope of the present disclosure. In addition, not only individual embodiments described below but also a combination of the embodiments can, of course, fall within the concept and technical scope of the present disclosure, as modifications, equivalents or substitutes included in the concept and technical scope of the present disclosure.

Figure 1:
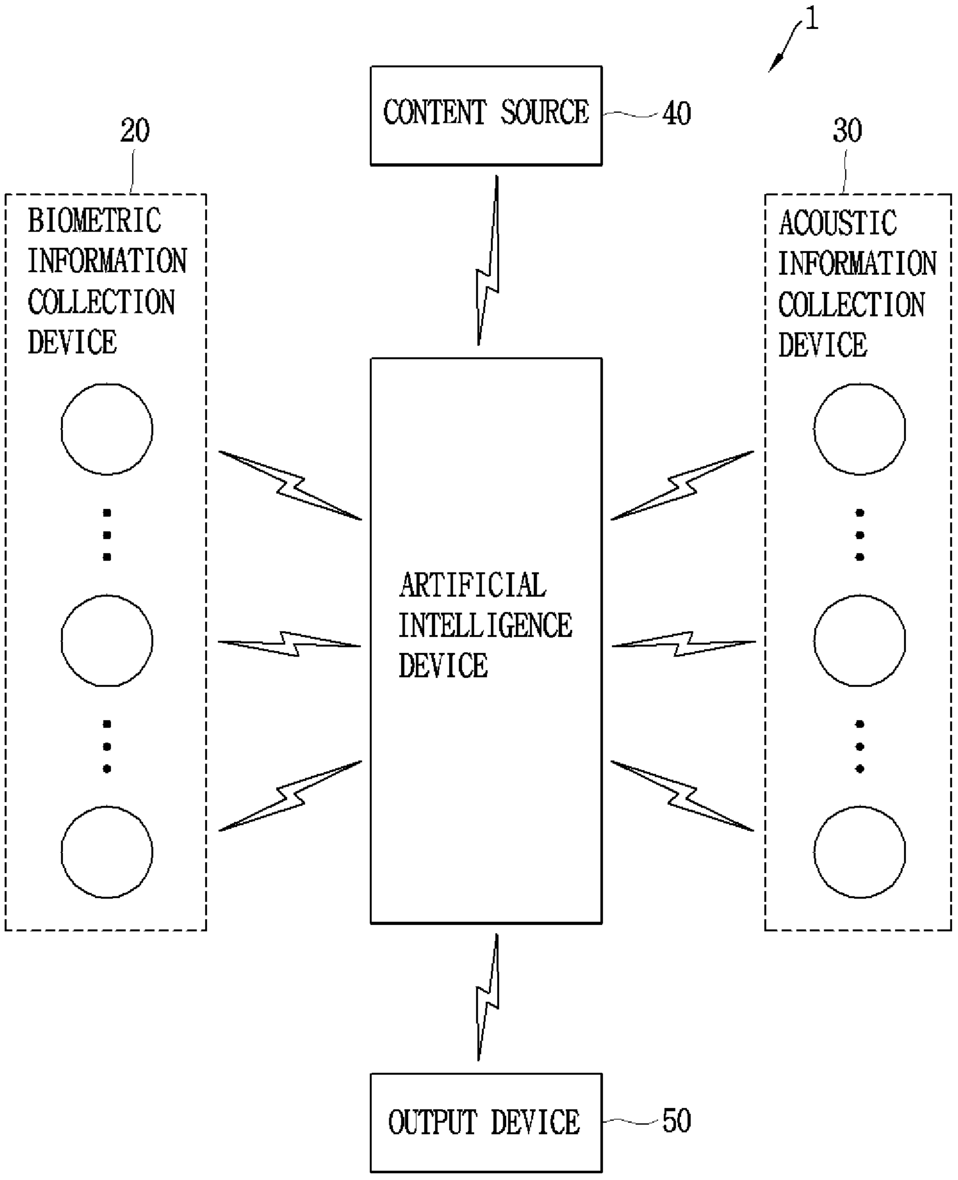
FIG. 1 is a conceptual diagram for explaining a configuration of a system including biometric information collection devices, acoustic information collection devices, and an artificial intelligence device according to an embodiment of the present disclosure.

FIG. 1 is a conceptual diagram for explaining a configuration of a system 1 according to an embodiment of the present disclosure, including biometric information collection devices 20, acoustic information collection devices 30, and an artificial intelligence device 10.

Referring to FIG. 1, the artificial intelligence device 10 according to an embodiment of the present disclosure can be connected to at least one biometric information collection device 20, a content source 40, and an output device 50 in a preset wireless communication mode. In addition, the artificial intelligence device 10 can also be connected to at least one acoustic information collection device 30.

Here, the biometric information collection device 20 can be a device that collects biometric information on a user. As an example, the biometric information collection device 20, which is a wearable device that can be worn by the user, can be a device that can be attached to the user's body to detect biometric information such as the user's heart rate, blood pressure, body temperature, or brain waves from a portion attached thereto. Additionally, the biometric information can include the user's movement. In this case, the biometric information collection device 20 can include at least one of a smart watch, smart glasses, or a smart band that can be worn by the user.

Alternatively, the biometric information collection device 20 can be a device that senses an acoustic signal generated from the user at a specific location. For example, the biometric information collection device 20 can be a device (e.g., a microphone) placed at a specific location to sense acoustic information generated from the user under a specific situation. As an example, the biometric information collection device 20 can be an acoustic sensor attached to the user's bed to sense an acoustic signal generated from the user who is sleeping, such as the user's breathing or snoring in a sleep ready state or a sleep state.

Alternatively, the biometric information collection device 20 can be a smartphone held or carried by the user. In this case, the smartphone can be provided with at least one bio sensor that can collect the user's biometric information so as to collect the user's biometric information in contact using the provided bio sensor. For example, the smartphone can be provided with a photo-plethysmography (PPG) sensor to detect a photoplethysmography signal from the user holding the smartphone and measure the user's respiratory rate based on the detected photoplethysmography signal. Additionally, the smartphone can be with an electrocardiogram (ECG) sensor to detect an electrocardiogram signal from the user holding the smartphone and measure the user's heart rate based on the detected electrocardiogram signal.

The artificial intelligence device 10 according to an embodiment of the present disclosure can be simultaneously or sequentially connected to one or more biometric information collection devices 20 through a wireless communication connection according to a preset mode to collect the user's biometric information detected by the connected one or more biometric information collection devices 20.

Here, the artificial intelligence device 10 can select biometric information collected from each biometric information collection device 20 based on a preset condition. As an example, the preset condition can be an estimated user's situation. That is, the artificial intelligence device 10 can determine a device to collect biometric information based on the estimated user's situation, and can only receive the user's biometric information collected through the determined collection device.

Alternatively, the preset condition can be related to a device that collects biometric information. For example, when there are a plurality of collection devices that collect the same biometric information, the artificial intelligence device can select any one of the collection devices according to the operating state of the collection device or the specification of the collection device, and receive the user's biometric information through the selected collection device.

Alternatively, the preset condition can be related to the accuracy of the collected biometric information. For example, a biometric signal that can be detected from the user's skin, such as a heart rate, can be detected through a smartphone held by the user or a smart watch worn by the user. In this case, the artificial intelligence device 10 can determine that the user's heart rate detected from the smart watch worn on the user's wrist is more accurate than the user's heart rate detected from the user's palm in contact with the smartphone held by the user. Therefore, the artificial intelligence device 10 can select and receive the heart rate measured by the smart watch.

Meanwhile, the artificial intelligence device 10 can estimate the user's current situation based on the user's biometric information collected from at least one connected biometric information collection device 20. As an example, when the detected heart rate or respiratory rate of the user corresponds to a sleeping state, the artificial intelligence device 10 can determine that the user is currently in a sleeping state. Alternatively, when the detected heart rate and respiratory rate of the user are above a predetermined number of times and the user's movement above a predetermined level is detected regularly, it can be estimated that the user is currently exercising.

In order to estimate the user's situation, the artificial intelligence device 10 can further use not only the user's biometric information but also environment information (e.g., location information, visual information, illumination information, etc.) around the user, and the environment information can be collected directly by the artificial intelligence device 10 or collected from at least one other device connected thereto. Here, the at least one device that collects the environment information around the user can include the biometric information collection device 20 that collects the biometric information, or can include the output device 50 connected to the artificial intelligence device 10 or at least one acoustic information collection device 30.

Meanwhile, the artificial intelligence device 10 can estimate the user's current situation based on biometric information sensed from at least one biometric information collection device 20 connected thereto. Furthermore, the artificial intelligence device 10 can retrieve user-personalized content according to the estimated user situation from the content source 40, and control the output device 50 to output the content retrieved from the content source 40 through the output device 50. To this end, the artificial intelligence device 10 can detect an effect of the currently output content on the user based on biometric information received from the biometric information collection device 20, and distinguish whether the output content has a positive or negative effect on the user according to the estimated user's situation. Furthermore, the artificial intelligence device 10 can learn a user-personalized acoustic characteristic corresponding to the currently estimated user situation according to the effect of the currently output content on the user.

Here, the user-personalized content retrieved by the artificial intelligence device 10 from the content source 40 according to the estimated user's situation can be due to a previously learned user-personalized acoustic characteristic. Furthermore, based on a result of detecting the effect of currently output content on the user, the learning result can be continuously updated.

Meanwhile, the user can be affected not only by the content being played, but also by various other sounds included in the content being played. As an example, when the estimated user's situation is a meditation situation and the current weather is rainy, a change in biometric information detected from the user can be caused by the sound of rain as well as the currently estimated situation, that is, the content output for meditation. That is, not only simply the content being played, but also various other sounds that the user can hear, such as natural sounds or household noises, can affect a change in the user's biometric information.

Accordingly, the artificial intelligence device 10 can be further connected to at least one acoustic information collection device 30 capable of detecting acoustic information around the user from the user's surroundings to detect not only the output content but also sounds that the user can hear, that is, acoustic information around the user.

Here, the acoustic information collection device 30 can be a fixed type that is fixedly placed in a specific location, or it can be a mobile type that can be worn or carried by the user and moved with the user, such as the user's smartphone or wearable device. Meanwhile, when the connected acoustic information collection device 30 is a fixed type, the artificial intelligence device 10 can estimate the user's situation based on the connected acoustic information collection device 30 or an acoustic information collection device that provides the collected acoustic information. As an example, in a case where an acoustic information collection device is attached to or placed on the user's bed, the artificial intelligence device 10 can determine, when the acoustic information collection device is connected thereto or when acoustic information is transmitted from the acoustic information collection device, that the user is currently in a state of being in the bed. Furthermore, based on acoustic information or biometric information detected from the acoustic information collection device or the biometric information collection device, it can be distinguished whether the user in the bed is sleeping.

Meanwhile, the learning of the artificial intelligence device 10 and the output of user-personalized content can be performed separately. That is, even when the user does not request the output of content, the artificial intelligence device 10 can collect the user's biometric information and acoustic information around the user based on at least one connected biometric information collection device 20 and at least one acoustic information collection device 30, and perform learning according to the collected information.

As an example, when the user does not request the output of content, the artificial intelligence device 10 can distinguish a change in the user's biometric state due to natural sounds around the user, such as a sound of wind, a sound of rain, or a chirping of birds, based on biometric information collected from the user. Furthermore, according to the user's situation estimated based on the biometric information collected from the user, it can be determined whether the change in the biometric state is positive or negative.

As an example, even when only natural sounds are detected around the user without an acoustic signal according to the output of content, the artificial intelligence device 10 can collect the user's biometric signal through the biometric information collection device 20. Furthermore, when the collected biometric signal, such as a heart rate, a blood pressure, or the like is more stabilized, it can be detected whether the natural sound has a positive or negative effect on the user based on the estimated user's situation.

For example, in a case where a natural sound such as a sound of water droplets or a sound of wind caused by a breeze, which are below a predetermined magnitude and have a repetitive melody structure, are detected around the user, and the detected heart rate, blood pressure or the like of the user is stabilized, when the estimated user's situation is sleeping or meditating, the artificial intelligence device 10 can distinguish that the natural sound has a positive influence on the user. Then, the artificial intelligence device 10 can analyze the characteristics of the natural sound, that is, the beat, magnitude, pitch, and the like, and perform learning as personalized content for the currently estimated user situation, that is, the user situation corresponding to meditation or sleep, according to the characteristics of the analyzed natural sound.

On the contrary, in a state where the same user's situation is estimated, even though the same natural sound is detected, when there is no change in the user's heart rate or blood pressure, or when the heart rate or blood pressure increases, the artificial intelligence device 10 can distinguish that natural sound has a negative effect on the user. In this case, the artificial intelligence device 10 cannot perform learning for the currently detected natural sound.

Alternately, even though the same natural sound is detected and the detected user's heart rate or blood pressure is stabilized, when the estimated user's situation is different, the artificial intelligence device 10 cannot perform learning for the currently detected natural sound. For example, when the user's state estimated from the collected biometric information is exercising, the artificial intelligence device 10 can determine that the currently detected natural sound is not effective in enhancing the user's exercise effect. Then, the artificial intelligence device 10 cannot perform learning for the currently detected natural sound.

Figure 2:
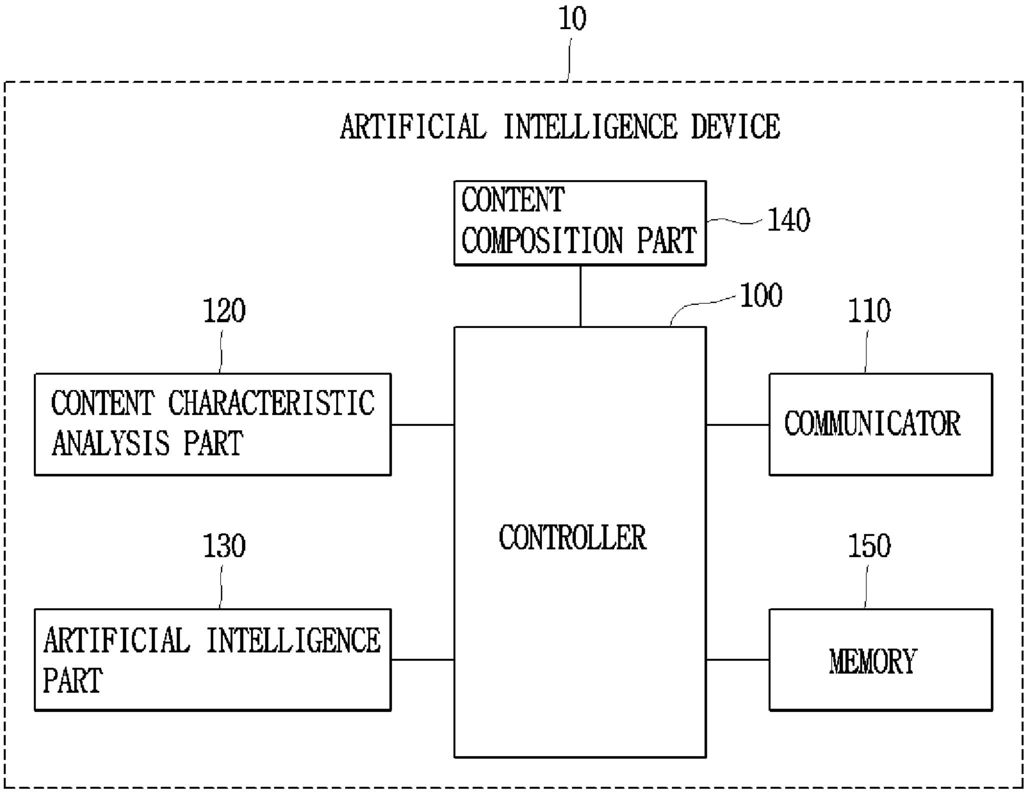
FIG. 2 is a block diagram for explaining a configuration of an artificial intelligence device according to an embodiment of the present disclosure.

As described above, the artificial intelligence device 10 that estimates the user's situation based on the user's biometric information collected from the biometric information collection device 20, determines whether acoustic information around the user has an effective effect on the estimated user's situation based on acoustic information around the user collected from the acoustic information collection device 30 and a change in the collected biometric information, and learns the characteristics of user-personalized content according to the estimated user's situation according to the determination result will be described in more detail in FIG. 2 below.

Meanwhile, the artificial intelligence device 10 can be connected to the content source 40 including at least one content item, and can be connected to the output device 50 capable of playing content retrieved from the content source 40.

Here, the content source 40 can be a device around the artificial intelligence device 10 including at least one content data. As an example, the content source 40 can include a mobile phone, a smart phone, a laptop computer, a digital broadcasting terminal, a personal digital assistant (PDA), a portable multimedia player (PMP), a navigator, a slate PC, a tablet PC, an ultrabook, a wearable device (e.g., a smart watch, smart glasses, a head mounted display (HMD)), or the like. Additionally, the content source 40 can include a desktop computer or digital TV.

Alternatively, the content source 40 can be a preset server that can be connected through a wireless network connection. Here, the server can be a server that provides a requested sound source through real-time streaming. In this case, the artificial intelligence device 10 can retrieve content according to a user-personalized acoustic characteristic previously learned for the currently estimated user's situation from the server, and request the retrieved content from the server. Then, the server can provide the content requested by the artificial intelligence device 10 in a real-time streaming manner, and the artificial intelligence device 10 can control the output device 50 to output the content provided from the server, that is, the content source 40.

Here, the content provided from the content source 40 and output from the output device 50 can be auditory content. In this case, the output device 50 can be configured to include at least one speaker for playing auditory content provided from the content source 40.

Meanwhile, the content provided and output from the content source 40 can be visual content. In this case, the output device 50 can include a display capable of playing visual content.

Furthermore, the artificial intelligence device 10 can estimate the user's situation based on the user's biometric information collected by at least one biometric information collection device 20, and distinguish whether the played visual content has a positive or negative effect on the user based on the estimated user situation. Furthermore, according to a result of the distinguishment, a user-personalized characteristic, in this case, a user-personalized visual content characteristic, can be learned.

Meanwhile, in the following description, for the sake of convenience of explanation, it will be described on the assumption that the content is auditory content. However, as described above, the present disclosure cannot, of course, be limited thereto, and can also, of course, be applied even when the content is visual content.

In this case, the user-personalized content characteristic learned by the artificial intelligence device 10 according to an embodiment of the present disclosure can be a user-personalized visual content characteristic. Then, the artificial intelligence device 10 can be connected to at least one visual information collection device (not shown) for collecting visual information around the user. In this case, the visual information collection device (not shown) can be provided to collect visual information around the user so as to collect information on an illuminance around the user, a space around the user (e.g., an area of the space, etc.), or the like, and can include a sensor for collecting the visual information, and the like.

FIG. 2 is a block diagram for explaining a configuration of the artificial intelligence device 10 according to an embodiment of the present disclosure.

Referring to FIG. 2, the artificial intelligence device 10 according to an embodiment of the present disclosure can include a controller (or control unit) 100, a communicator (communication unit) 110 connected to the controller 100, a content characteristic analysis part 120, an artificial intelligence part 130, and a memory 150. Furthermore, the artificial intelligence device 10 can further include a content composition part 140. The elements shown in FIG. 2 are not essential for implementing the artificial intelligence device 10, and thus the artificial intelligence device 10 described herein can have more or fewer element than those listed above.

Meanwhile, the artificial intelligence device 10 can be implemented with various devices. As an example, the artificial intelligence device 10 can be implemented in the form of a mobile phone, a smart phone, a laptop computer, a digital broadcasting terminal, a PDA, a PMP, a navigator, a slate PC, a tablet PC, an ultrabook, a wearable device (e.g., a smart watch, smart glasses, an HMD), or the like. In addition, it can also, of course, be implemented with a desktop computer or digital TV.

First, the communicator 110 can perform wireless communication between at least one biometric information collection device 20 and at least one acoustic information collection device 30, and the artificial intelligence device 10 using a preset communication technology. As an example, the communicator 110 can perform wireless communication between the at least one biometric information collection device 20 and the artificial intelligence device 10 or between the at least one acoustic information collection device 30 and the artificial intelligence device 10 according to a Bluetooth or Bluetooth low energy (BLE) technology.

Here, while the artificial intelligence device 10 according to an embodiment of the present disclosure performs wireless communication with at least one other device (e.g., at least one biometric information collection device, at least one acoustic information collection device, and an output device, etc.), a low-power Bluetooth technology can be more preferably used in terms of saving power consumption.

Furthermore, the content characteristic analysis part 120 can analyze acoustic information collected from the acoustic information collection device 30 or acoustic characteristics of specific content currently output through the output device according to the control of the controller 100. As an example, the content characteristic analysis part 120 can analyze a beat, an interval, a timbre, a sound magnitude, and the like as acoustic characteristics from the specific content or collected acoustic information. Here, the content characteristic analysis part 120 can further analyze additional information according to an analysis target. For example, when the analysis target is specific content, background information on the content, such as a composer or singer of the content, a played instrument or a gender of the singer, and a genre of the content, can be additionally analyzed. On the contrary, when the analysis target is collected acoustic information, information such as an interval (repetition period) at which a certain melody is repeated and a type of sound (e.g. a sound of water, a sound of wind, a sound of rain, etc.) from the collected acoustic information can be additionally analyzed.

Meanwhile, the artificial intelligence part 130, which performs a role of processing information based on an artificial intelligence technology, can include at least one module that performs at least one of learning of information, inference of information, perception of information, and processing of a natural language.

The artificial intelligence part 130 can perform at least one of learning, inferring, and processing a vast amount of information (big data), such as information store in the artificial intelligence device 10, environment information around the artificial intelligence device 10, and information stored in a communicable external storage using a machine learning technology.

Here, learning can be achieved through the machine learning technology. The machine learning technology is a technology that collects and learns a large amount of information based on at least one algorithm, and determines and predicts information on the basis of the learned information. The learning of information is an operation of grasping characteristics of information, rules and judgment criteria, quantifying a relation between information and information, and predicting new data using the quantified patterns.

Algorithms used by the machine learning technology can be algorithms based on statistics, for example, a decision tree that uses a tree structure type as a prediction model, an artificial neural network that mimics neural network structures and functions of living creatures, genetic programming based on biological evolutionary algorithms, clustering of distributing observed examples to a subset of clusters, a Monte Carlo method of computing function values as probability using randomly-extracted random numbers, and the like.

As one field of the machine learning technology, deep learning is a technology of performing at least one of learning, determining, and processing information using the artificial neural network algorithm. The artificial neural network can have a structure of linking layers and transferring data between the layers. This deep learning technology can be employed to learn vast amounts of information through the artificial neural network using a graphic processing unit (GPU) optimized for parallel computing.

Meanwhile, the artificial intelligence part 130 can collect a vast amount of information for applying machine learning technology through information collection devices connected to the artificial intelligence device 10. Here, the information collection devices can include at least one of the biometric information collection devices 20 and the acoustic information collection devices 30, and can include at least one information collection device that collects other information on the user's surrounding environment in addition to the biometric information and acoustic information. In addition, the collection of information below can be understood as a term that includes an operation of extracting information stored in the memory 150 or receiving information from another device connected through communication, for example, the at least one information collection device.

The artificial intelligence part 130 can estimate (or infer) the user's situation, and distinguish whether the currently output content or acoustic information collected around the user is positive or negative for the estimated user situation based on the estimated user's situation using information learned using the machine learning technology.

That is, the artificial intelligence part 130 can distinguish that the currently output content or acoustic information collected around the user has a positive effect on the user when the biometric information detected from the user matches the estimated user's situation, and distinguish that the currently output content or acoustic information collected around the user has a negative effect on the user when the biometric information detected from the user does not match the estimated user's situation.

Furthermore, according to the distinguishment result, the artificial intelligence part 130 can perform learning for the user's personalized acoustic characteristics regarding the currently estimated user's situation, based on the acoustic characteristics of the currently output content or acoustic information collected around the user.

Furthermore, the artificial intelligence part 130 can control other elements of the artificial intelligence device 10 or transmit a control command for executing a specific operation to the controller 100 on the basis of information learned using machine learning technology. The controller 100 can control the artificial intelligence device 10 based on a control command, thereby learning user-personalized acoustic characteristics according to the estimated user situation, and retrieving content matching the learned acoustic characteristics from the content source 40. Additionally, the controller 100 can control the communicator 110 to receive the retrieved content from the content source 40, and control the output device 50 to output the received content.

Meanwhile, in this specification, the artificial intelligence part 130 and the controller 100 can be understood as the same element. In this case, functions performed by the controller 100 described herein can be expressed as being performed in the artificial intelligence part 130, and the controller 100 can be referred to as the artificial intelligence part 130, or conversely the artificial intelligence part 130 can also be referred to as the controller 100.

On the other hand, in this specification, the artificial intelligence part 130 and the controller 100 can be understood as separate elements. In this case, the artificial intelligence part 130 and the controller 100 can perform various controls on the artificial intelligence device 10 through data exchange with each other. The controller 100 can perform at least one of functions that are executable in the artificial intelligence device 10, or control at least one of the elements of the artificial intelligence device 10, based on a result derived from the artificial intelligence part 130. Furthermore, the artificial intelligence part 130 can also be operated under the control of the controller 180.

In addition, the memory 150 stores data that support various functions of the artificial intelligence device 10. The memory 150 can store a plurality of application programs (or applications) executed in the artificial intelligence device 10, data for the operation of the artificial intelligence device 10, commands, and data for the operation of the artificial intelligence part 130 (e.g., at least one algorithm information for machine learning, etc.).

In addition, the memory 150 can include information on at least one information collection device that can be connected to the artificial intelligence device 10. Additionally, collection information collected from each of the information collection devices can be stored therein. Furthermore, the memory 150 can include information on the user situation that can be estimated based on the collected at least one user biometric information. Moreover, the memory 150 can include data for distinguishing the user's biometric state that matches the estimated user situation and the user's biometric state that changes based on the collected biometric information.

Based on this data, the artificial intelligence part 130 can distinguish the trend of a change in the user's biometric state through the collected user biometric information, and distinguish whether the currently output content or acoustic information collected around the user has a positive or negative effect on the estimated user situation depending on whether the change trend matches the estimated user situation.

Meanwhile, the memory 150 can store information on user-personalized acoustic characteristics corresponding to each user's situation according to the learning of the artificial intelligence part 130. Furthermore, the memory 150 can store content received from the content source 40. Additionally, the memory 150 can store data for controlling the output device 50 to output the stored content.

Meanwhile, the controller 100 can control an overall operation of the artificial intelligence device 10. For example, the controller 100 can control the communicator 110 to receive information collected by the information collection devices from at least one information collection device communicably connected thereto. Furthermore, the controller 100 can control the artificial intelligence part 130 to estimate the user's situation based on the received collected information, and distinguish whether an environment around the user, that is, an acoustic environment around the user formed by content being output or sounds around the user, affects the estimated user's situation, as well as distinguish, when affecting the situation, whether it has a positive or negative effect thereon.

Furthermore, according to an effect of the acoustic environment around the user on the user, the controller 100 can control the content characteristic analysis part 120 to analyze elements that create the acoustic environment around the user, that is, acoustic characteristics from content currently output through the output device 50 or sounds around the user.

Furthermore, the controller 100 can learn user-personalized acoustic characteristics according to the currently estimated user situation based on the analyzed acoustic characteristics, retrieve content matching the learned acoustic characteristics from the content source 40, and control the output device 50 to output content received in response to the retrieval. Therefore, the controller 100 can allow content that has a positive effect on the user in the currently estimated user situation according to the user's personal characteristics as a result of learning to be output through the output device 50, thereby creating an acoustic environment having a positive effect on the currently estimated user situation.

Meanwhile, when learning for the user-personalized acoustic characteristics for the estimated user situation has been sufficiently carried out, the controller 100 can generate content corresponding to the learned user-personalized acoustic characteristics through the composition of content.

As an example, the controller 100 can retrieve, when user-personalized acoustic characteristics derived as a result of sufficient learning for the currently estimated user situation are determined as a voice of a specific gender (e.g. female), a specific genre (e.g. ballad), and a specific composer, content items having characteristics matching the user-personalized acoustic characteristics from the content source 40. Then, the output device 50 can be controlled to generate one content item (composite content) composed of a plurality of retrieved content items, and output the generated composite content.

Alternatively, the controller 100 can compose user-personalized content from content items retrieved according to the user-personalized acoustic characteristic derived through the learning. As an example, the controller 100 can retrieve content items having at least some of the user-personalized acoustic characteristics derived for the currently estimated user situation from the content source 40, and extract portions that match the user-personalized acoustic characteristics from the retrieved content items. Furthermore, the extracted partial content items can be connected to combine them into one content item.

For example, when the user-personalized acoustic characteristic derived through the learning is a specific type of sound repeated at a constant beat (e.g., a sound of water droplets falling at a constant beat, etc.), the controller 100 can retrieve content items related to the sound of water droplets from among the content items of the content source 40, and extract only portions that match the beat of the user-personalized acoustic characteristics from the retrieved content items. Furthermore, the extracted portions can be combined to generate the composite content.

Alternatively, the controller 100 can generate the composite content by partially modifying the retrieved content according to the user-personalized acoustic characteristics derived through the learning. As an example, the controller 100 can retrieve content items related to a sound of water droplets from among the content items of the content source 40, extract portions corresponding to the sound of water droplets from the retrieved content items, and modify the beat of the extracted portions according to the beat of user-personalized acoustic characteristics. Furthermore, the modified or extracted portions can be combined to generate the composite content.

For the composition of the content, the artificial intelligence device 10 according to an embodiment of the present disclosure can further include the content composition part 140 that extracts at least some of content items retrieved and received from the content source 40, and combines the plurality of extracted portions with one another.

Meanwhile, when there is another device to which an artificial intelligence algorithm is applied from among other connectable devices (e.g., information collection devices), the controller 100 of the artificial intelligence device 10 according to an embodiment of the present disclosure can perform collaboration with other devices to which the artificial intelligence algorithm is applied in order to further reduce a time required for learning the user-personalized acoustic characteristics, and providing content according to a result of the learning.

As an example, when another device to which an artificial intelligence algorithm is applied (hereinafter referred to as another artificial intelligence device) is detected, the controller 100 can exchange information on the artificial intelligence algorithm applied to the artificial intelligence part 130 and the other artificial intelligence device, with the other artificial intelligence device. As an example, information on software versions of the artificial intelligence algorithms applied to the artificial intelligence part 130 and the other artificial intelligence device can be exchanged with each other. In this case, based on the exchanged information, the artificial intelligence part 130 and the other artificial intelligence device can identify the characteristics and learning method of the artificial intelligence algorithm applied to the other device. In this case, the exchange of the information can be carried out by the artificial intelligence device 10 in a manner of broadcasting the information of the artificial intelligence part 130, and by the other artificial intelligence device in a manner of transmitting its own information in response to the broadcasted information.

Meanwhile, the artificial intelligence part 130 and the other artificial intelligence device can learn user-personalized acoustic characteristics for the user situation estimated according to the foregoing embodiment of the present disclosure through the information exchange, and exchange information on variables required for a service that provides personalized content according to the learned acoustic characteristics. Additionally, information on the expected processing time that can be processed for each variable can be exchanged.

Therefore, the controller 100 of the artificial intelligence device 10 can acquire information on variables required for the other connectable artificial intelligence devices, respectively, and processing times of the respective variables, and detect whether there are variables that can be processed by the artificial intelligence device 10. Furthermore, when there is a detected variable, based on a time that can be processed by the artificial intelligence device 10, a device (another algorithm device or the artificial intelligence device 10 corresponding to the detected variable) can be detected. Furthermore, according to the result, the controller 100 can negotiate a processing process for the variable with another algorithm device corresponding to the detected variable to process the variable by either one of the other algorithm device and the artificial intelligence device 10 corresponding to the detected variable.

Meanwhile, the information exchanged between the other artificial intelligence device and the artificial intelligence device 10 can further include information on a ready state and information on a service authority. Here, the information on the ready state can include information on an operating state of the device. Additionally, the information on the service authority can be information on whether other devices can use the exchanged information and the provided data.

As described above, in order to reduce a time required for the artificial intelligence device 10 according to an embodiment of the present disclosure to provide a service with other artificial intelligence devices, a process of performing negotiation on a process processing process, a process of determining a processing entity of variables according to the negotiation, and information exchanged between the artificial intelligence device 10 and the other artificial intelligence devices will be described in more detail with reference to FIGS. 6 to 9 below.

Meanwhile, in the above description, the artificial intelligence device 10 according to an embodiment of the present disclosure and other devices (the biometric information collection device 20, the acoustic information collection device 30, the content source 40, and the output device 50)

connected to the artificial intelligence device 10, and a configuration of the artificial intelligence device 10 have been described in detail.

Hereinafter, in a system including the artificial intelligence device 10 described above, embodiments related to a control method that can be implemented in the artificial intelligence device 10 will be described with reference to the accompanying drawings. It is obvious to those skilled in the art that the present disclosure can be embodied in other specific forms without departing from the concept and essential characteristics thereof.

Figure 3:
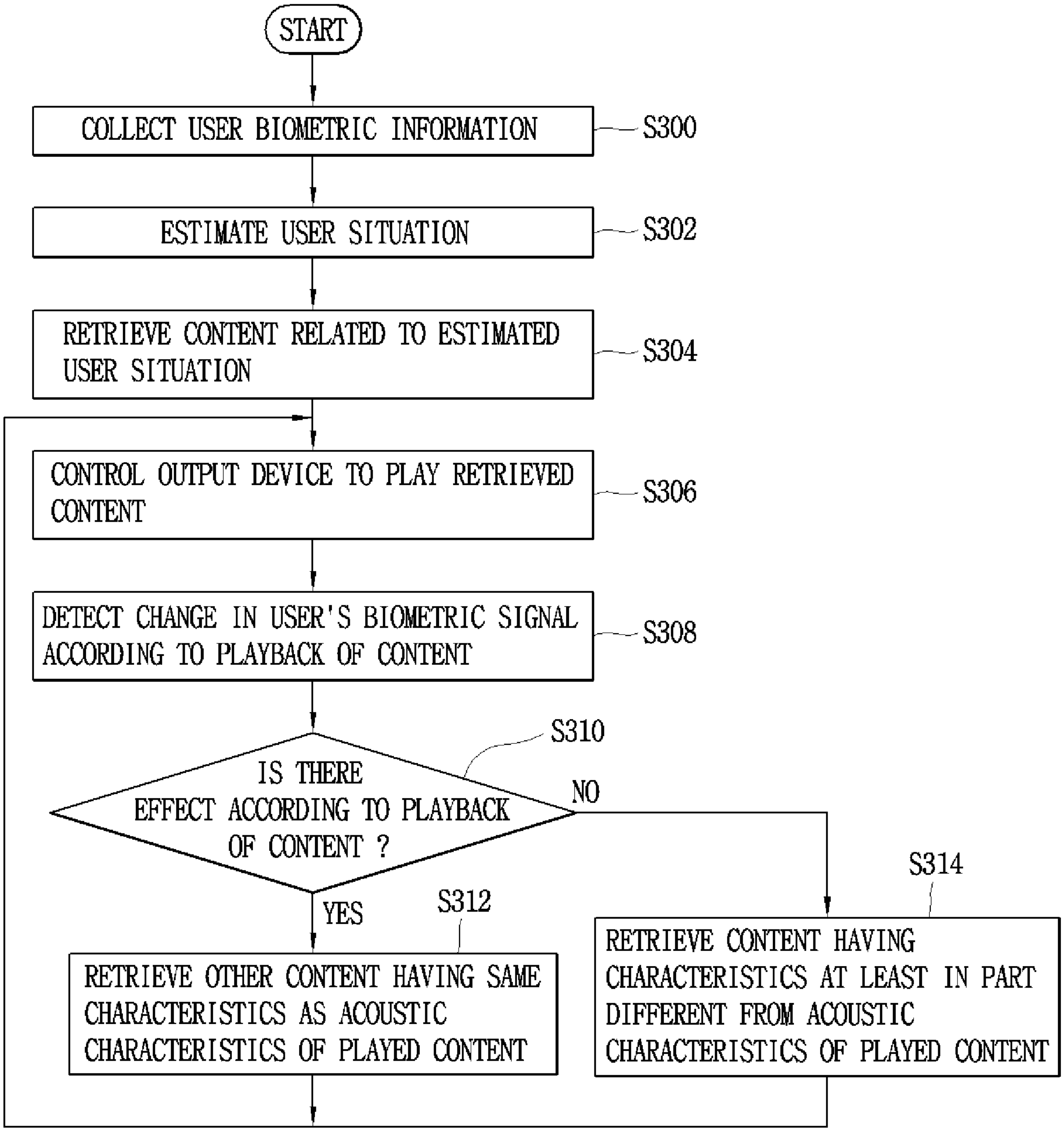
FIG. 3 is a flowchart showing an operation process in which an artificial intelligence device according to an embodiment of the present disclosure provides user-personalized content according to a user's situation.

FIG. 3 is a flowchart showing an operation process in which the artificial intelligence device 10 according to an embodiment of the present disclosure provides user-personalized content according to a user's situation.

Referring to FIG. 3, the controller 100 provided in the artificial intelligence device 10 according to an embodiment of the present disclosure can first receive the user's biometric information detected by each biometric information collection device 20 from at least one biometric information collection device 20 communicably connected thereto (S300). Furthermore, based on the received at least one user biometric information, the user's current situation can be estimated.

As an example, the artificial intelligence device 10 can acquire biometric information related to the user's heart rate, body temperature, and respiratory rate from a smart band or smart watch worn by the user. Additionally, information on a movement of the user's wrist can be acquired from the smart band or smart watch. Furthermore, the user's current situation can be estimated based on the acquired heart rate, body temperature, respiratory rate, and movement information.

For example, in a situation where the user is exercising on a treadmill, or the like, the controller 100 can detect a fast heart rate, a more frequent respiratory rate than usual, an increase in body temperature, and a movement of regularly moving with a displacement above a predetermined level from the smart band or smart watch. Accordingly, the controller 100 can estimate that the user is currently exercising based on the detected biometric information.

On the contrary, when slower and more regular heart and respiratory rates than usual and an almost stopped body movement are detected through at least one connected biometric information collection device 20, the controller 100 can estimate the user's situation as meditating or lying in a bed to sleep.

In this case, the controller 100 can estimate the user's situation more precisely based on information collected through at least one acoustic information collection device 30. As an example, as described above, in a state where heart and respiratory rates are slower and more regular than usual, and an almost stopped body movement are detected, when sounds typically detected during the user's normal sleep (hereinafter referred to as sounds during sleep), for example, a snoring sound or the user's breathing sound during sleep, are detected, the controller 100 can estimate the user's situation as if the user is sleeping. However, when a sound of specific content is detected from around the user instead of the sounds during sleep, the controller 100 can determine that the user is meditating.

In this case, sounds during the user's sleep can be determined by learning according to the user's sleep, which can be distinguished according to learning performed in the at least one biometric information collection device 20 when the artificial intelligence device 10 or the at least one biometric information collection device 20 is a device to which an artificial intelligence algorithm is applied. In addition, the determination of whether the user performs meditation according to the sound of the specific content can be distinguished by a result of the learning of the artificial intelligence device 10 according to a pattern of acoustic information detected when the user repeatedly performs meditation, or according to the learning carried out in the at least one acoustic information collection device 30 when the at least one acoustic information collection device 30 is a device to which an artificial intelligence algorithm is applied.

Meanwhile, when the user's situation is estimated in the step S302, the controller 100 can retrieve content related to the estimated user situation (S304). In this case, as a result of the learning of the artificial intelligence part 130, when there is a user-personalized acoustic characteristic learned above a preset level corresponding to the currently estimated user situation, the controller 100 can retrieve content having characteristics matching the learned user-personalized acoustic characteristics from the content source 40 in the step S304. For example, in the step S304, the controller 100 can retrieve at least one content item that matches a beat, a timbre, a sound type, and the like according to the user-personalized acoustic characteristics from the content source 40.

Meanwhile, when there are no the learned user-personalized acoustic characteristics, the controller 100 can retrieve content that is generally recommended according to the currently estimated user's situation. As an example, the controller 100 can retrieve at least one content item included in a category matching a situation that matches the user's situation according to the content category provided from the content source 40. That is, when the estimated user's situation is a meditation practice, the controller 100 can retrieve at least one content item classified into a category corresponding to the meditation practice from the content source 40.

Alternatively, the controller 100 can retrieve at least one content item according to preset search criteria according to the currently estimated user situation. As an example, content retrieval criteria can be pre-stored in the memory 150 for each user's situation, and the controller 100 can retrieve at least one content item based on pre-stored retrieval criteria (e.g., a beat or tempo corresponding to the meditation practice situation, a beat or tempo corresponding to the exercise performance situation) according to the estimated user's situation.

When at least one content item related to the user situation estimated in the step S304 is retrieved, the controller 100 can receive the retrieved content item from the content source 40 and control the output device 50 to play the received content item. (S306). Furthermore, from the user's biometric information collected by at least one connected biometric information collection device 20, a change in the user's biometric signal according to the playback of the content can be detected (S310).

Furthermore, the controller 100 can distinguish whether the playback of the content is effective based on the detected change in the user's biometric signal (S310).

To this end, the controller 100 can first distinguish whether the playback of the content affects a change in the user's biometric signal. That is, the controller 100 can compare the user's biometric information collected after a preset time has elapsed since the playback of the content starts with the user's biometric information collected before the preset time has elapsed. Furthermore, as a result of the comparison, when a difference in the user's biometric information is within an error range, it can be determined that the playback of the content did not affect the change in the user's biometric signal. Furthermore, it can be distinguished that the playback of the content is not effective for the currently estimated user's situation.

Meanwhile, when there is a difference between the user's biometric information collected after a preset time has elapsed since the playback of the content starts and the user's biometric information collected before the preset time has elapsed, the controller 100 can distinguish that the playback of the content affects the current estimated user's situation. Furthermore, when it is distinguished that the playback of the content has an effect on the currently estimated user's situation, it can be distinguished whether the effect of the playback of the content is positive or negative.

In this case, the controller 100 can distinguish whether the effect of playing the content is positive or negative depending on whether a difference in the collected biometric information, that is, a change in the user's biometric signal, matches the currently estimated user's situation.

For example, when the estimated user's situation is a meditation practice situation and a heart or respiratory rate changes more regularly and stably as a result of detecting a change in the user's biometric signal, the controller 100 can distinguish that the playback of the content has a positive effect on the currently estimated user's situation, that is, the meditation practice. On the contrary, when the heart or respiratory rate becomes more irregular and unstable as a result of detecting a change in the user's biometric signal, it can be distinguished that the playback of the content has a negative effect on the user's situation (meditation practice).

In this way, the controller 100 can distinguish whether the playback of the current content has a positive or negative effect based on the user's situation. Therefore, even though changes in the biometric signal are similar, when the estimated user's situation is different, the distinguishment results can also, of course, be different from each other.

As an example, the controller 100 can distinguish whether the playback of the current content has a positive or negative effect according to the currently estimated user's situation, when the user's heart or respiratory rate becomes faster and increases faster than a preset level, as a result of detecting a change in the user's biometric signal according to a difference between the user's biometric information collected after a preset time has elapsed since the playback of the content and the user's biometric information collected before the preset time has elapsed. That is, when the currently estimated user's situation is exercising, the controller 100 can distinguish that the playback of the content has a positive effect on the currently estimated user's situation. On the contrary, when the currently estimated user's situation is meditating, the controller 100 can distinguish that the playback of the content has a negative effect on the currently estimated user's situation.

Alternatively, the controller 100 can distinguish whether the playback of the content has an effect on the currently estimated user's situation depending on whether a change in the user's biometric signal due to a difference between the user's biometric information collected after a preset time has elapsed since the playback of the content and the user's biometric information collected before the preset time has elapsed is faster or slower than a previously learned change rate in the biometric signal according to the currently estimated user's situation.

For example, in a situation where the user is exercising, when a rate of change in the detected biometric signal for a preset time since the playback of the content is faster than a rate of increase in a heart or respiratory rate, which typically increases according to the user's exercise situation, the controller 100 can distinguish that there is an effect due to the playback of the content. Here, a rate of change in the heart or respiratory rate, which typically increases according to the user's exercise situation, can be learned based on biometric information collected while the user is exercising.

Alternatively, in a situation where the user is meditating, when typically stabilized to a predetermined level, that is, when a rate of change in the detected biometric signal for a preset time since the playback of the content slows down more quickly than a rate of in a heart or respiratory rate, which slows down according to the user's meditation situation, the controller 100 can distinguish that there is an effect due to the playback of the content. Here, the rate of change in the heart or respiratory rate, which typically slows down according to the user's meditation situation, can be learned based on biometric information collected while the user is meditating.

Meanwhile, as a result of the distinguishment in the step S310, when there is an effect, that is, a positive effect, of the currently played content on the currently estimated user's situation, the controller 100 can analyze the acoustic characteristics of the currently played content. In this case, the controller 100 can analyze various acoustic characteristics such as a beat, a tempo, a timbre, a sound type, and the like from the content being played. Furthermore, content having the same characteristics as the analyzed acoustic characteristics can be retrieved again from the content source 40 (S312).

Furthermore, the process can proceed to the step S306 to control the output device 50 to output the currently retrieved content. Furthermore, the controller 100 can perform the process again from the step S308 to the step S310 for the currently output content, that is, the retrieved content having the same characteristics.

Accordingly, after the playback of the currently played content is completed, the output device 50 can continuously output other content having the same characteristics. Additionally, the effect of the other content having the same characteristics on the user's situation can be analyzed, and a process of retrieving and outputting other content having the same characteristics according to a result of the analysis can be repeated.

Accordingly, when the currently estimated user's situation is in a ready state for meditation or sleep, content that stabilizes the user's mind and body and slows down the heart or respiratory rate can be continuously output when the user listens. Accordingly, when the user is meditating, the mind and body can reach a stable state faster, and when the user is in a sleep ready state, a time required to enter a sleep state (sleep delay time) can be reduced.

Meanwhile, as a result of the distinguishment in the step S310, in a case where there is no effect of the currently played content on the currently estimated user's situation, that is, when the playback of the content does not affect or has a negative effect on the currently estimated user's situation, the controller 100 can retrieve content that differs at least in part from the acoustic characteristics of the currently playing content from the content source 40 (S314). Furthermore, the process can proceed to the step S306 to control the output device 50 to output the currently retrieved content.

Furthermore, the controller 100 can analyze the effect of the playback of the content on the user through a process of the steps S308 and S310 with respect to the content currently being output, that is, the content retrieved again in the step S314. Furthermore, according to a result of the analysis, the controller 100 can further retrieve other content having the same acoustic characteristics as the currently playing content (step S312), or retrieve content having at least some of the acoustic characteristics again (step S314), and proceed to the step S306 to control the output device 50 to output the content retrieved in the step S312 or the step S314. Accordingly, when the content currently being output is effective (when it has a positive effect) in the user's situation, content having the same acoustic characteristics can be continuously output, and when it is not effective in the user's situation, content having different acoustic characteristics can be output through the output device 50.

Meanwhile, when re-entering the step S306 in which the retrieved content is played, the controller 100 can detect whether the currently estimated user's situation has changed. To this end, the controller 100 can re-estimate the user's situation based on biometric information collected from the connected biometric information collection device 20, as described in the steps S300 and S302. Furthermore, it can be determined whether the estimated user's situation is the same as the previously estimated user's situation.

Furthermore, when the estimated user situation changes, the process proceeds to the step S304, and content related to the changed user situation can be retrieved from the content source 40. Furthermore, the process can proceed to steps S306 to S310 to play the retrieved content, detect a change in the user's biometric signal according to the played content, and analyze an effect of the played content according to the detected change in the biometric signal. Furthermore, according to a result of the analysis, new content can be retrieved in step S312 or step S314.

Meanwhile, as shown in FIG. 3, when content is output through the output device 50, a change in the detected user's biometric signal can be a result due to not only a sound according to the content output through the output device 50, but also various natural noises around the user. That is, the change in the user's biometric signal can be due to an acoustic environment around the user, including at least one of a sound of the output content and natural noises around the user.

Accordingly, the artificial intelligence device 10 according to an embodiment of the present disclosure can be connected to at least one of the acoustic information collection devices 30 that collect acoustic information around the user, in order to detect a change in the user's biometric signal and learn resultant user-personalized acoustic characteristics according to an effect on the user of the sound environment around the user, including a sound of the output content, as well as an acoustic environment where the sound of the output content is not included. Furthermore, the user-personalized acoustic characteristics can be learned based on acoustic information collected from at least one connected acoustic information collection device 30.

Figure 4:
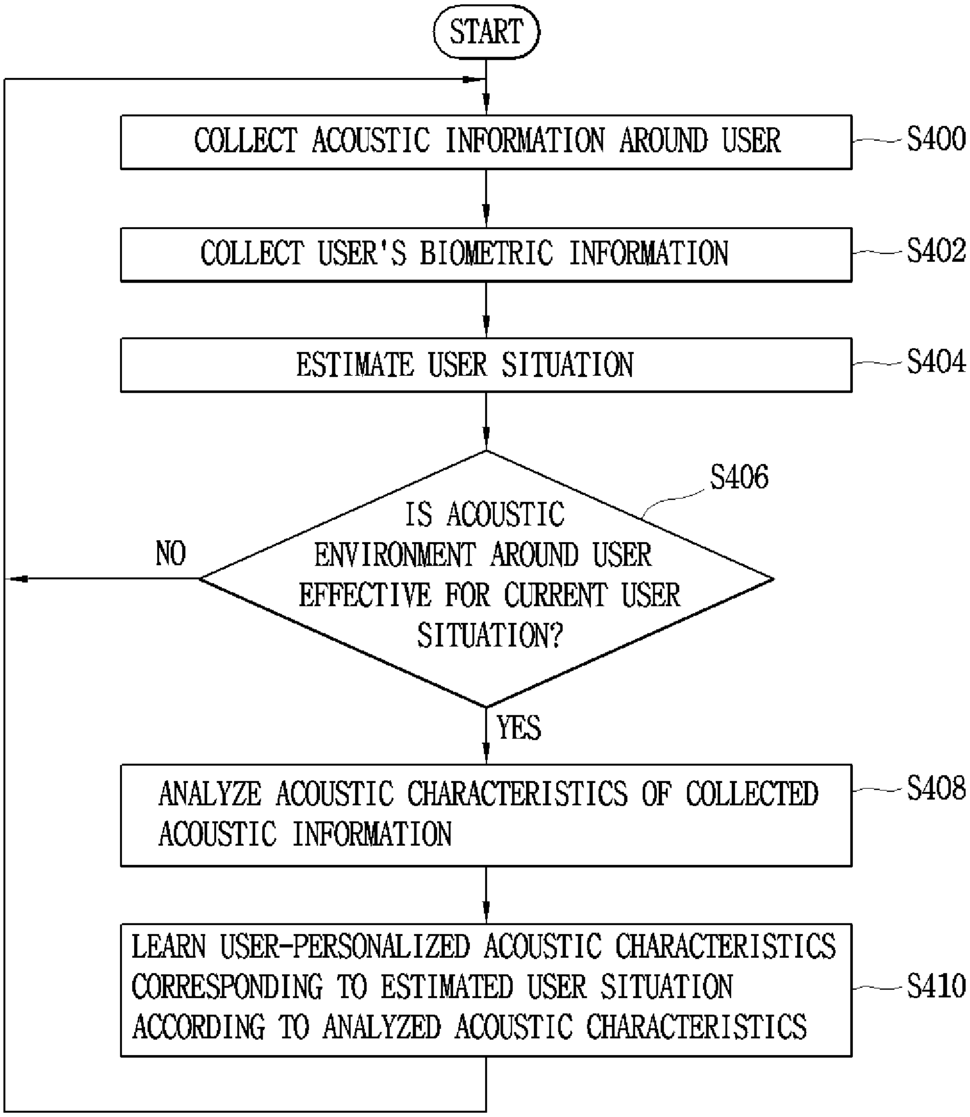
FIG. 4 is a flowchart showing an operation process in which an artificial intelligence device according to an embodiment of the present disclosure learns user-personalized acoustic characteristics based on acoustic information collected from the surroundings.

FIG. 4 is a flowchart showing an operation process in which the artificial intelligence device 10 according to an embodiment of the as the present disclosure learns user-personalized acoustic characteristics based on acoustic information collected from the surroundings as described above.

Referring to FIG. 4, the controller 100 of the artificial intelligence device 10 according to an embodiment of the present disclosure can first collect acoustic information around the user from at least one connected acoustic information collection device 30 (S400). Here, the acoustic information collection device 30 can include various wearable devices such as a smart watch or smart band worn by the user.

Meanwhile, the wearable device can be a biometric information collection device as described above. That is, some of the acoustic information collection devices and some of the biometric information collection devices can be the same devices, and in this case, the devices can separately and simultaneously collect biometric information and acoustic information.

Furthermore, the controller 100 can collect the user's biometric information through at least one connected biometric information collection device 20 (S402). Furthermore, the user's current situation can be estimated based on the collected user's biometric information (S404). Here, the steps S402 and S404 can be the same as or similar to the steps S300 and S302 of estimating the user's situation based on the user's biometric information collected in FIG. 3. Alternatively, the user estimation results of the steps S300 and S302 can be used as they are.

Meanwhile, when the user's situation is estimated in the step S404, the controller 100 can distinguish whether the acoustic environment around the user has an effect on the currently estimated user's situation (S406).

Here, the step S406 can be a process similar to that of distinguishing whether the sound of the content is effective for the user in the step S310 of FIG. 3. That is, under the estimated user situation, the controller 100 can detect a change in the user's biometric signal according to a difference between the user's biometric information received after a preset time and the user's biometric information received before the preset time. Furthermore, depending on whether the detected change in the biometric signal matches the currently estimated user situation, it can be distinguished whether a current acoustic environment around the user has a positive effect on the user, that is, effective for the user.

Meanwhile, as a result of the distinguishment in the step S406, when it is distinguished that the current acoustic environment around the user is effective for the currently estimated user situation, the controller 100 can analyze the acoustic characteristics of the currently collected acoustic information (S408). As an example, the controller 100 can analyze acoustic characteristics common to a plurality of acoustic information items collected from a plurality of different acoustic information collection devices in the step S408. Here, the acoustic characteristics can include a timbre, a sound type, and a melody beat or tempo that are common to the plurality of acoustic information. In this case, the controller 100 can extract at least one of the timbre, sound type, and melody beat or tempo that are common to the plurality of acoustic information as an acoustic characteristic of the collected acoustic information in the step S408.

Furthermore, as a result of the analysis in the step S408, when at least one acoustic characteristic is extracted from the collected acoustic information, user-personalized acoustic characteristics for the currently estimated user's situation can be learned according to the at least one extracted acoustic characteristic (S410). To this end, the controller 100 can perform learning for the user-personalized acoustic characteristics through machine learning, for example, a deep learning-based learning algorithm. Furthermore, when the learning is completed, the controller 100 can proceed to step S400 again to repeat a process from the step S400 to the step S406, and perform a process from step S408 to step S410 again according to a result of the distinguishment in the step S406.

Meanwhile, as a result of the distinguishment in the step S406, when the current acoustic environment around the user is not effective for the currently estimated user situation, the controller 100 can proceed to the step S400 again to perform a process of collecting acoustic information around the user. Therefore, when the acoustic information detected around the user has no effect on the currently estimated user environment, steps S402 to S406 can be performed again without learning.

Meanwhile, the process described in FIG. 4 can perform learning for user-personalized acoustic characteristics according to acoustic information detected around the user, which can be performed even when content is not output through the output device 50. That is, it can be a process performed separately from the output of content.

Since the learning process can be performed independently of the output of content, the artificial intelligence device 10 according to an embodiment of the present disclosure can perform learning based on sounds detected around the user in a state in which the output device 50 is not controlled, that is, in a state in which no content is output. Therefore, the artificial intelligence device 10 can analyze the effect of natural sounds such as a sound of rain, a sound of water droplets, or a sound of wind on the user with respect to the currently estimated user's situation, and learn acoustic characteristics that can have a positive effect on the currently estimated user situation based on the natural sounds, that is, user-personalized acoustic characteristics. Furthermore, when the user-personalized acoustic characteristics are sufficiently learned, the controller 100 can use the learned user-personalized acoustic characteristics to retrieve content related to the user situation estimated in the step S304 of FIG. 3. In this case, the step S304 of FIG. 3 can be a step of retrieving content according to the learned user-personalized acoustic characteristics from the content source 40.

Meanwhile, in the foregoing description, an example in which learning is carried out depending on whether the collected acoustic information has a positive effect on the user has been described, but contrary thereto, the learning can also be carried out for a case that has a negative effect on the user and a case that does not have an effect on the user.

In this case, the controller 100, that is, the artificial intelligence part 130, can extract common characteristics of the collected acoustic information regardless of whether the collected acoustic information has a positive effect, and can set different weights for respective extracted characteristics based on the effect of the acoustic information on the user. For example, the controller 100 can set a positive (+) weight when the collected acoustic information has a positive effect on the user according to the currently estimated user situation, and set a negative (−) weight when the collected acoustic information has a negative effect on the user.

When learning is performed as described above, the controller 100 can acquire not only user-personalized acoustic characteristics that have a positive effect on a specific user situation, but also user-personalized acoustic characteristics that have a negative effect on the specific user situation.

Meanwhile, when there are user-personalized acoustic characteristics for a specific situation that have been sufficiently learned, the artificial intelligence device 10 according to an embodiment of the present disclosure can control the content composition part 140 to generate new content based on the learned acoustic characteristics.

Figure 5:
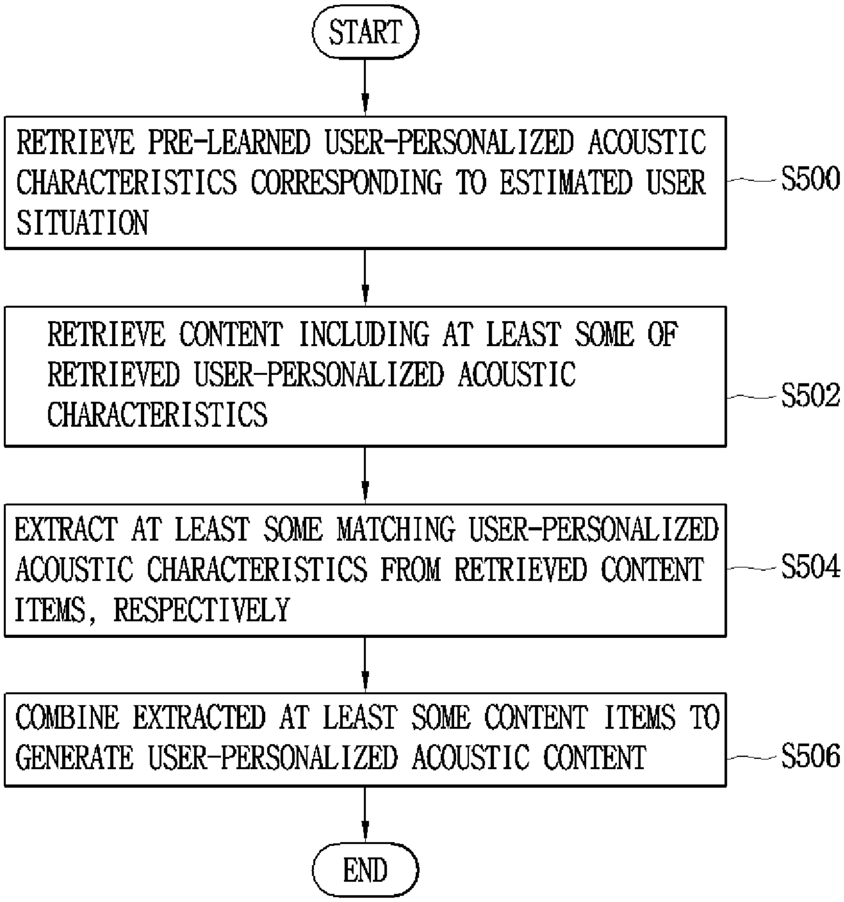
FIG. 5 is a flowchart showing an operation process in which an artificial intelligence device according to an embodiment of the present disclosure generates user-personalized content based on previously learned acoustic characteristics.

FIG. 5 is a flowchart showing an operation process in which the artificial intelligence device 10 according to an embodiment of the present disclosure generates user-personalized content based on previously learned acoustic characteristics as described above.

Referring to FIG. 5, the artificial intelligence device 10 according to an embodiment of the present disclosure can retrieve previously learned user-personalized acoustic characteristics corresponding to the currently estimated user situation (S500). In this case, at least one different acoustic characteristic can be retrieved in step S500. As an example, a specific beat or tempo, a specific timbre, a specific sound type, a specific composer, a specific genre, a specific singer, or the like can be retrieved by using the user-personalized acoustic characteristic.

Furthermore, the controller 100 can retrieve content items including the retrieved user-personalized acoustic characteristics from the content source 40 (S502). Here, the controller 100 can retrieve content items in which not only all of the retrieved user-personalized acoustic characteristics but also at least a predetermined number of acoustic characteristics are the same. Accordingly, from among the content items of the content source 40, content items whose acoustic characteristics match at least some of the user-personalized acoustic characteristics retrieved in the step S500 can be retrieved in the step S502.

In addition, the controller 100 can retrieve content items that include some of portions matching the user-personalized acoustic characteristics retrieved in the step S500 from among the content items of the content source 40. That is, when the user-personalized acoustic characteristics retrieved in the step S500 are a tempo corresponding to moderato and a sound type corresponding to a sound of falling water droplets, the controller 100 can retrieve content including at least portion of the sound of water droplets repeatedly falling at a normal speed from the content source 40.

Furthermore, when the content items are retrieved in the step S502, the controller 100 can extract at least a portion matching the user-personalized acoustic characteristics retrieved in the step S500 from each of the retrieved content items (S504). In this case, when the entire retrieved content matches the user-personalized acoustic characteristics, the entire content can be extracted, and when a portion of the retrieved content matches the user-personalized acoustic characteristics, a portion of the content can be extracted in the step S504.

In the step S504, when the extraction of content items matching the user-personalized acoustic characteristics is completed, the controller 100 can combine the extracted content items to generate new user-personalized acoustic content (S506). As an example, the controller 100 can connect the content items extracted in step S504 to one another to generate new content corresponding to a preset time. Here, the preset time can be preset by the user, or can be determined according to a duration time of the currently estimated user's situation.

In this case, the controller 100 can determine the preset time according to a learning result related to the duration time of the user situation. That is, the controller 100 can learn the duration time of the currently estimated user situation based on data about times during which the currently estimated user situation is maintained, and generate the composite content having a playback time calculated based on the learned situation duration time.

Meanwhile, according to the foregoing description, it has been mentioned that the artificial intelligence device 10 according to an embodiment of the present disclosure can collaborate with, when there are other devices to which an artificial intelligence algorithm is applied from among other connectable devices (e.g. information collection devices), the other devices to which the artificial intelligence algorithm is applied in order to further reduce a time required for a service according to an embodiment of the present disclosure, that is, a service that learns user-personalized acoustic characteristics and provides content according to the learned result.

Figure 6:
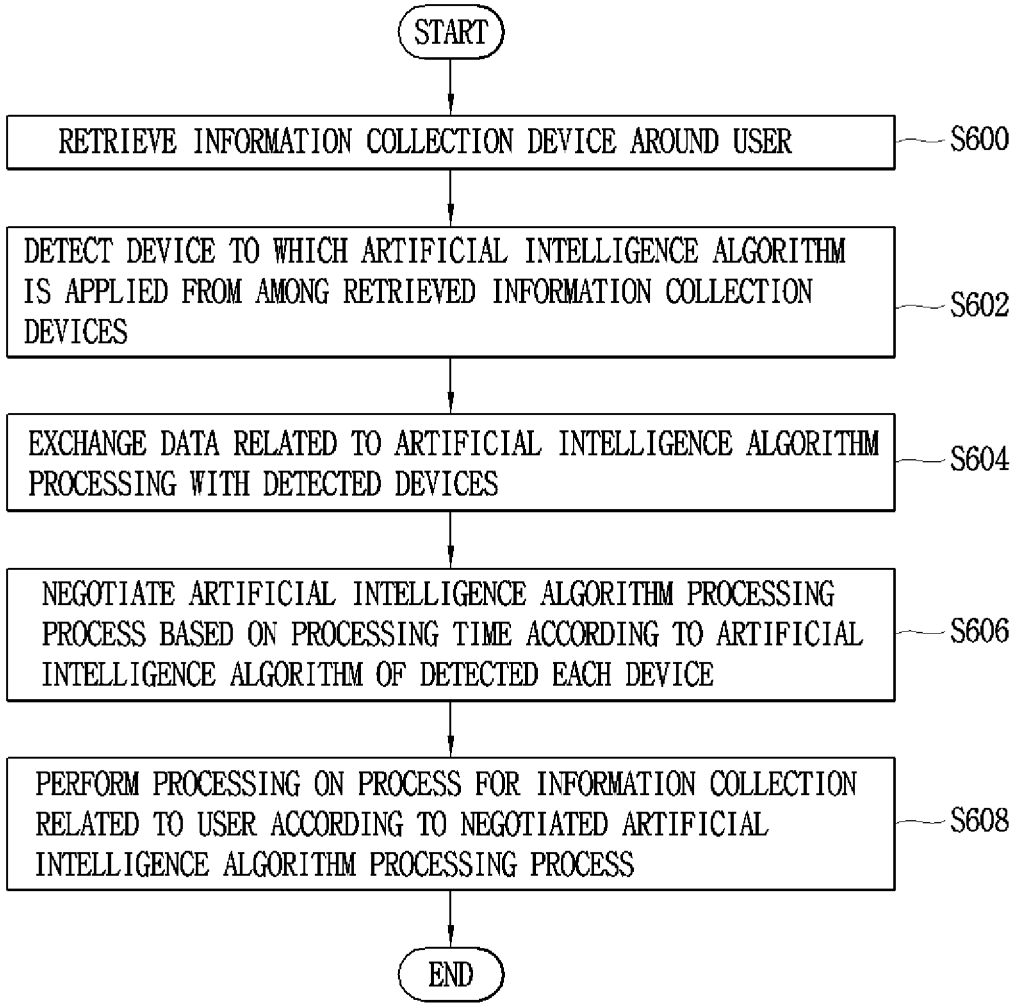
FIG. 6 is a flowchart showing an operation process in which an artificial intelligence device according to an embodiment of the present disclosure collaborates with other devices to which an artificial intelligence algorithm is applied.
Figure 7:
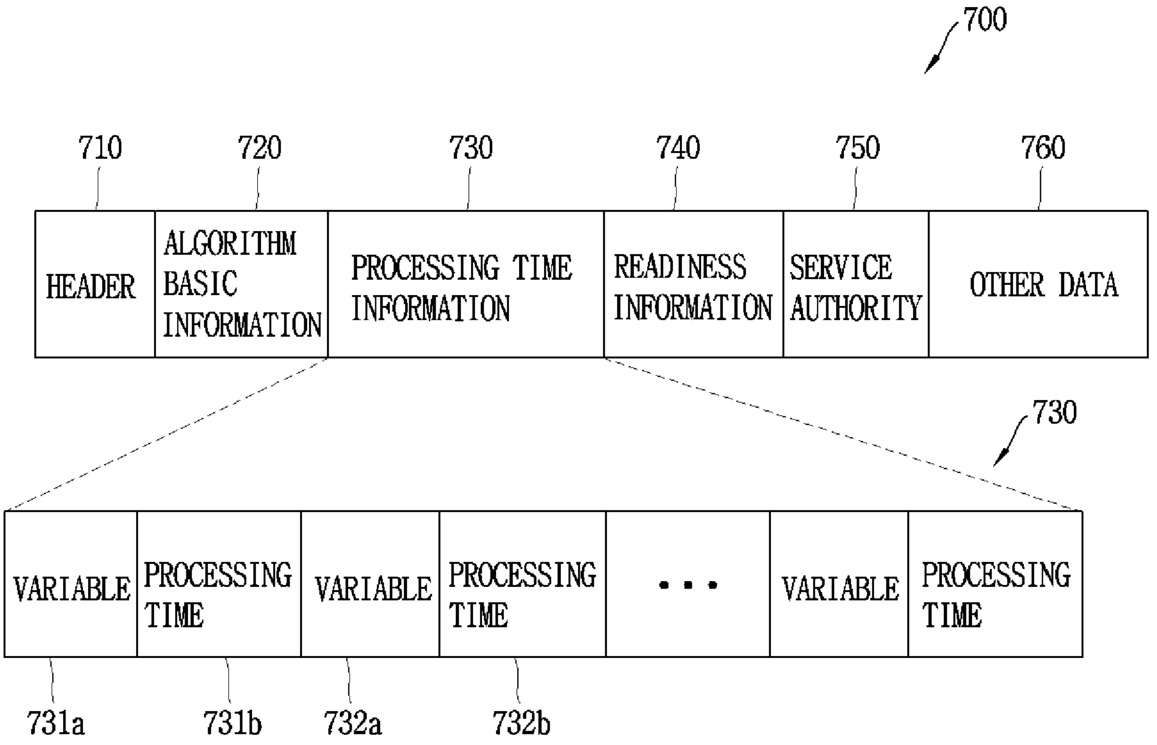
FIG. 7 is an exemplary diagram showing an example of information exchanged by an artificial intelligence device according to an embodiment of the present disclosure with other devices to which the artificial intelligence algorithm is applied for collaboration.
Figure 8:
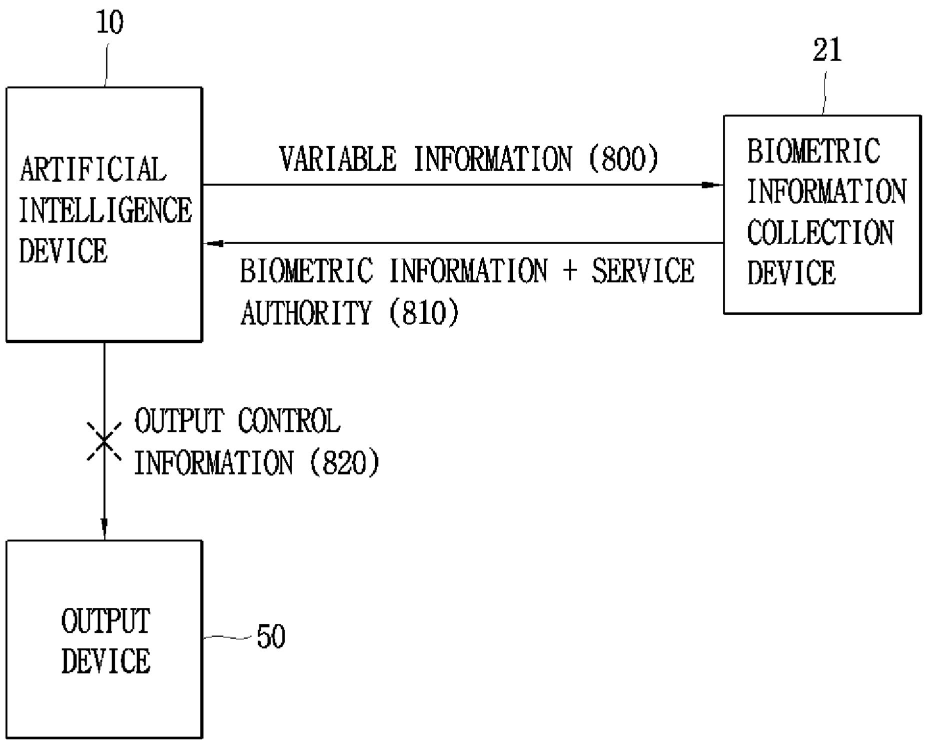
FIG. 8 is a conceptual diagram showing a structure in which an artificial intelligence device according to an embodiment of the present disclosure controls another device based on information collected through the collaboration.

FIG. 6 is a flowchart showing an operation process in which the artificial intelligence device 10 according to an embodiment of the present disclosure collaborates with other devices to which an artificial intelligence algorithm is applied as described above. Furthermore, FIG. 7 is an exemplary diagram showing an example of information exchanged by the artificial intelligence device 10 according to an embodiment of the present disclosure with other devices to which the artificial intelligence algorithm is applied for collaboration. Furthermore, FIG. 8 is a conceptual diagram showing a structure in which the artificial intelligence device 10 according to an embodiment of the present disclosure controls another device based on information collected through the collaboration.

First, FIG. 6 can be an operation process performed to connect to at least one other device, for example, at least one biometric information collection device or at least one acoustic information collection device, in the present disclosure.

That is, through an operation process shown in FIG. 6 below, the at least one collection device can be connected to the artificial intelligence device 10 according to an embodiment of the present disclosure, and a result detected by the sensor provided in each collection device can be processed based on a processing process negotiated with the artificial intelligence device 10, and the processed result can be transmitted to the artificial intelligence device 10 as collected data. Therefore, the biometric information or acoustic information collected in the step S300 of FIG. 3 or the step S400 or S402 of FIG. 4 can be data that is processed in a biometric information collection device or an acoustic information collection device according to an operation process and a negotiation process in FIG. 6 below, and transmitted to the artificial intelligence device 10.

Referring to FIG. 6, the controller 100 of the artificial intelligence device 10 according to an embodiment of the present disclosure can first retrieve at least one device to collect information around the user (S600). In this case, at least one information collection device (e.g., biometric information collection device, acoustic information collection device, location information collection device, etc.) worn by the user or placed around the user can be retrieved as a result of the retrieval.

Meanwhile, the controller 100 can detect a device to which an artificial intelligence algorithm is applied from among at least one information collection device retrieved in the step S600 (S602). Furthermore, data related to the processing of the artificial intelligence algorithm can be exchanged with the detected devices, that is, devices to which the artificial intelligence algorithm is applied (hereinafter referred to as other artificial intelligence devices) (S604). In this case, the data exchange of the information can be carried out by the artificial intelligence device 10 in a manner of broadcasting the data of the artificial intelligence part 130, and by the other artificial intelligence device in a manner of transmitting its own data in response to the reception of the broadcasted data.

Here, the artificial intelligence device 10 can learn user-personalized acoustic characteristics and exchange information on variables required for a service that provides personalized content according to the learned acoustic characteristics with other artificial intelligence devices. Additionally, information on the expected processing time that can be processed for each variable can be exchanged. FIG. 7 shows an example of information included in data exchanged between the artificial intelligence device 10 and other artificial intelligence devices to this end.

Referring to FIG. 7, data (hereinafter referred to as exchange data 700) exchanged between the artificial intelligence device 10 according to an embodiment of the present disclosure and other artificial intelligence devices can include a header 710 and algorithm basic information 720, and processing time information 730, readiness information 740, a service authority 750, and other data 760.

Here, the header 710 can include the identification information of an artificial intelligence device transmitting the exchange data 700 shown in FIG. 7. The header 710 can also include information on a segment serial number of data. Accordingly, a device receiving the exchange data 700 of FIG. 7 can identify a sender device that has sent the exchange data 700 based on the information included in the header 710. Furthermore, when data is partitioned due to environmental factors such as a buffer or a network capacity and a plurality of exchange data partitions are transmitted, the original data can be restored by merging the exchange data partitions transmitted from the sender device based on the segment serial number.

Meanwhile, the exchange data 700 can include basic information on an algorithm applied to the sender device, that is, algorithm basic information 720. Here, the algorithm basic information 720 can include information on a software name and a software version of an artificial intelligence algorithm applied to the sender device. The algorithm basic information 720 can also include information on which of methods applied to the algorithm, such as a decision tree, an artificial neural network, genetic programming, clustering, and a Monte Carlo method, is applied.

Accordingly, based on the exchange data 700, the artificial intelligence device 10 and the other artificial intelligence device can identify the characteristics and learning method of the artificial intelligence algorithm applied to the counterpart device.

Meanwhile, the processing time information 730 can include information on variables 731*a*, 732*a* that require processing for a service according to an embodiment of the present disclosure. Furthermore, the processing time information 730 can include information on a processing time that can be required for the sender device to process each of the variables (hereinafter referred to as processing time information 731*b*, 732*b*).

Additionally, the exchange data 700 can further include readiness information 740 on an operation ready state and information on service authority 750. Here, the information on the ready state can include an operating state of the device, that is, whether a service thereof is available. Additionally, the information on the service authority can be information on whether other devices can use the exchanged information and the provided data.

As an example, in a process of exchanging the information while connected to the artificial intelligence device 10, the biometric information collection device 20 or the acoustic information collection device 30 can display whether the artificial intelligence device 10 can use the collected information (e.g., biometric information or acoustic information) to provide a service through the service authority. In other words, when the user studies in a place that requires silence, such as a reading room, the biometric information collection device can provide the artificial intelligence device 10 with information limiting the use of the collected biometric information based on an environment around the user and the user's location as the service authority information.

Then, the artificial intelligence device 10 can receive biometric information with a limited service authority, and accordingly, cannot retrieve and output resultant content even when the user's personalized acoustic characteristics are learned in advance for the situation in which the user is studying.

However, even though the service authority is limited information, the artificial intelligence device 10 can use the received information to learn user-personalized acoustic characteristics according to the currently estimated user's situation.

As an example, the artificial intelligence device 10 can learn user-personalized acoustic characteristics for a current situation, that is, a situation in which the user is studying in a reading room based on acoustic information received from at least one connected acoustic information collection device 30 and biometric information (biometric information with a limited service authority) received from at least one connected biometric information collection device 20.

Meanwhile, the other data 760 can include various additional data that are not described above. For example, the other data 670 can include information collected by the sender device, for example, collected biometric information or acoustic information. Alternatively, in addition to the biometric information and acoustic information, other information collected by other related devices (for example, location information collection devices) can be included therein.

Meanwhile, in the step S604, the controller 100 can acquire information on variables required from the other connectable artificial intelligence devices, respectively, and processing times of the respective variables through the exchange of the exchange data 700 including the information shown in FIG. 7. Furthermore, based on the acquired variables and the processing times of the respective variables, the controller 100 can negotiate with another artificial intelligence device 10 to process the variables (S606). In this case, the controller 100 can detect a device capable of processing the variable more quickly based on a time that can be processed by the artificial intelligence device 10. Furthermore, based on a result of the detection, negotiation can be performed to determine an entity to process the variable.

Furthermore, when the process processing negotiation of the step S606 is completed, the controller 100 can process, together with at least one other artificial intelligence device, variables required in the negotiated artificial intelligence algorithm processing process, and collect data transmitted from the at least one other artificial intelligence device according to the processed variables (S608).

As an example, in a case where the user's location information is among variables required by a specific artificial intelligence device, when the specific artificial intelligence device is not equipped with a GPS device, the specific artificial intelligence device can calculate the user's location information based on information from a Wi-Fi module and at least one wireless access point (AP). On the contrary, when the artificial intelligence device 10 includes a GPS module, the artificial intelligence device 10 can calculate the user's location information more quickly and simply through the GPS module.

In this case, the user's location information can be calculated in a shorter time by the artificial intelligence device 10 than by the specific artificial intelligence device. Furthermore, such a difference in calculation time, that is, information on a processing time, can be exchanged between the specific artificial intelligence device and the artificial intelligence device 10 through the exchange of the exchange data 700.

Furthermore, in the step S606, the controller 100 can negotiate whether the artificial intelligence device 10 calculates the user location information or the specific artificial intelligence device calculates the user location information based on the variable, that is, the user location information, and a processing time of the variable. Therefore, the controller 100 can negotiate a processing process of the user location information (variable) with the specific artificial intelligence device to allow the artificial intelligence device 10 rather than the specific artificial intelligence device to calculate the user location information.

Furthermore, through this negotiation process, instead of the specific artificial intelligence device, the artificial intelligence device 10 can calculate the user's location information and provide it to the specific artificial intelligence device. Accordingly, a time to calculate the variable required by the specific artificial intelligence device to provide the service, that is, the user location information, can be reduced, and thus a time required to generate data to be provided to the artificial intelligence device 10 from the specific artificial intelligence device can be reduced. Furthermore, due to this reduction in time required, an overall time required to provide the service according to an embodiment of the present disclosure can be reduced.

FIG. 8 is a diagram showing an example in which variables are calculated based on a process processing negotiation between the artificial intelligence device 10 according to an embodiment of the present disclosure and the other artificial intelligence device, and collection information generated based on the calculated variables is provided to the artificial intelligence device 10 as described above.

Referring to FIG. 8, the artificial intelligence device 10 according to an embodiment of the present disclosure can process a specific variable on behalf of a specific biometric information collection device 21 through a negotiation made in the step S606 of FIG. 6. In this case, the specific biometric information collection device 21 can receive, instead of processing the specific variable itself, a variable processed by the artificial intelligence device 10 and process the received variable to generate and provide information required by the artificial intelligence device 10.

Therefore, as shown in FIG. 8, according to a process processing negotiation, the artificial intelligence device 10 can process a variable (e.g., user location) required for the collection of biometric information in the specific biometric information collection device 21. Furthermore, information on the processed variable, that is, variable information (e.g., user location information) 800, can be transmitted to the specific biometric information collection device 21. Then, the specific biometric information collection device 21 can collect biometric information required by the artificial intelligence device 10 through an artificial intelligence algorithm based on the received variable (user location information) 800, and transmit the collected biometric information to the artificial intelligence device 10.

As an example, the specific biometric information collection device 21 can collect the user's biometric information by reflecting variable information received from the artificial intelligence device 10, that is, user location information 800. For example, when the user's location according to the user location information 800 is a location such as a reading room where silence is required, the specific biometric information collection device 21 can distinguish that the reason why the user's breathing sound has become quiet is not due to physical stabilization such as when the user performs meditation, but due to locational reasons.

Therefore, even when the user's breathing sound becomes quieter than usual, the specific biometric information collection device 21 can generate biometric information indicating that the user's biometric signal is in a normal state and transmit it to the artificial intelligence device 10 (810).

Meanwhile, the information transmitted from the specific biometric information collection device 21 to the artificial intelligence device 10, that is, exchange data, can include information on a service authority. In this case, the service authority can include information on an authority to use the information included in the exchange data. Furthermore, the service authority can be determined according to environment information acquired from the user's surroundings, such as location information or time information.

In this case, the specific biometric information collection device 21 can identify that the current user's location is a 'reading room' based on variable information 800 received from the artificial intelligence device 10, that is, user location information. Then, the specific biometric information collection device 21 can determine an authority (service authority) to use the currently collected user's biometric information based on the user's location, and transmit information including the determined service authority along with the collected biometric information.

In this case, as described above, when the user's location is a 'reading room' where silence is required, the specific biometric information collection device 21 can transmit information including information indicating that the user is not authorized to use biometric information as the service authority.

Then, as shown in FIG. 8, the artificial intelligence device 10 can receive biometric information along with service authority information that restricts the use of biometric information. Accordingly, the artificial intelligence device 10 can be restricted from outputting content through the output device 50 using the collected biometric information (820). However, learning based on the received biometric information can be allowed.

Figure 9:
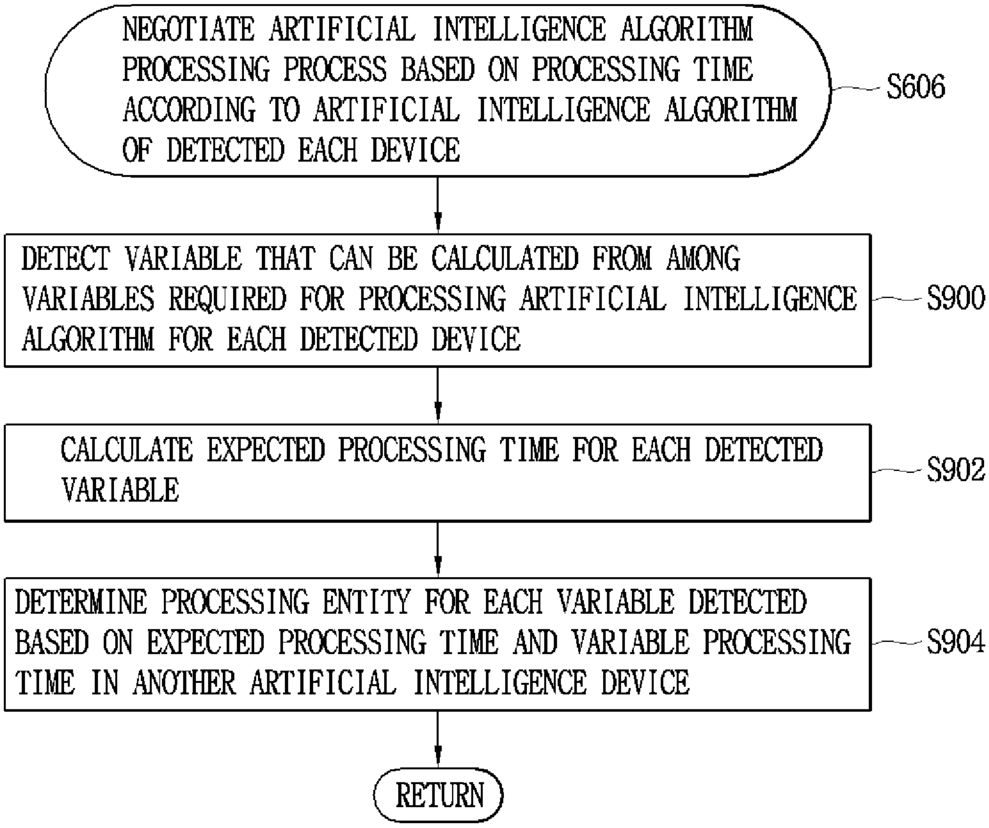
FIG. 9 is a flowchart showing an operation process in which an artificial intelligence device according to an embodiment of the present disclosure negotiates with another device to which the artificial intelligence algorithm is applied for collaboration.

Meanwhile, FIG. 9 is a flowchart showing in more detail an operation process in step S606 of FIG. 6 in which the artificial intelligence device 10 according to an embodiment of the present disclosure negotiates with another device to which an artificial intelligence algorithm is applied for collaboration.

Referring to FIG. 9, the controller 100 of the artificial intelligence device 10 according to an embodiment of the present disclosure can detect variables required for artificial intelligence algorithm processing for each device currently detected to have an artificial intelligence algorithm applied thereto for negotiation of the processing process. Furthermore, from among the detected variables, a variable that can be calculated by the artificial intelligence device 10 can be detected (S900).

Furthermore, the controller 100 of the artificial intelligence device 10 can calculate expected processing times for variables that can be calculated by the device itself, respectively, in the step S900 (S902). Furthermore, for each of the variables that can be calculated, an expected processing time calculated in the step S902 can be compared with a variable processing time in another artificial intelligence device. Furthermore, based on a result of the comparison, a processing entity for each variable that can be calculated can be determined (S904).

For example, when an expected processing time calculated for a specific variable is shorter than a variable processing time calculated by another artificial intelligence device by more than a preset threshold time, the controller 100 can negotiate a processing process for the specific variable with the other artificial intelligence device so that the artificial intelligence device 10 processes the specific variable.

Here, the preset threshold time is calculated in consideration of an amount of increase in computational load on the artificial intelligence device 10 as the artificial intelligence device 10 processes the specific variable instead, and when the expected processing time is shorter than the variable processing time by more than the threshold time, it can be determined that it is more advantageous for the artificial intelligence device 10 to process the specific variable. In this case, the threshold time can be a time determined through a plurality of experiments conducted in relation to the present disclosure.

Alternatively, the threshold time can be a time reflecting a time required to transmit the specific variable from the artificial intelligence device 10 to the other artificial intelligence device. In this case, the threshold time can have a value greater than the time required to transmit variable information calculated by the artificial intelligence device 10 to the other artificial intelligence device 10.

The foregoing present disclosure can be implemented as computer-readable codes on a program-recorded medium. The computer-readable medium can include any type of recording device in which data readable by a computer system is stored. Examples of the computer-readable media can include a hard disk drive (HDD), a solid-state disk (SSD), a silicon disk drive (SDD), a ROM, a RAM, a CD-ROM, a magnetic tape, a floppy disk, and an optical data storage device, and the like, and also include a device implemented in the form of a carrier wave (for example, transmission via the Internet). In addition, the computer can include the controller 100 of the artificial intelligence device 10. The above detailed description is therefore to be construed in all aspects as illustrative and not restrictive. The scope of the present disclosure should be determined by reasonable interpretation of the appended claims and all changes that come within the equivalent scope of the present disclosure are included in the scope of the present disclosure.

The invention claimed is:

1. An artificial intelligence device comprising:

a communicator configured to communicate with an output device, a content source and at least one biometric information collection device that collects a biometric information of a user, and to communicate with at least one acoustic information collection device that collects acoustic information around the user;

an artificial intelligence part configured to:

estimate a situation of the user based on the biometric information, detect an effect on the user corresponding to an acoustic environment around the user based on a change in the biometric information, and learn a user-personalized acoustic characteristic corresponding to the situation based on the effect; and a controller configured to:

retrieve at least one content item from the content source based on the user-personalized acoustic characteristic, and control the output device to output the at least one content item, wherein the controller is further configured to:

determine whether the acoustic environment around the user is positive or negative based on the acoustic information collected from the acoustic information collection device to generate a determination result, and based on the determination result, learn user-personalized acoustic characteristics based on the collected acoustic information.

2. The artificial intelligence device of claim 1, wherein the controller is further configured to estimate the situation based on at least one of the biometric information and the acoustic information, and detect the effect on the user based on at least one of the at least one content item output by the output device and the acoustic information collected by the acoustic information collection device.

3. The artificial intelligence device of claim 2, wherein the acoustic environment around the user is formed by at least one of an audio signal of the at least one content item output by the output device and an ambient noise around the user that is separate from the audio signal of the at least one content item.

4. The artificial intelligence device of claim 2, wherein the artificial intelligence part is further configured to determine whether the acoustic environment around the user has a positive or negative effect on the user, based on whether the change in the biometric information matches or corresponds to the situation of the user estimated by the artificial intelligence part.

5. The artificial intelligence device of claim 4, wherein the artificial intelligence part is further configured to distinguish whether the acoustic environment around the user affects the user when the change in the biometric information is greater than a previous change in the user biometric information previously learned for the situation.

6. The artificial intelligence device of claim 2, wherein the acoustic information collection device includes one or more of a mobile device that moves with a movement of the user and a fixed device that is fixedly placed in a specific place near the user.

7. The artificial intelligence device of claim 2, wherein the communicator is configured to communicate with the at least one biometric information collection device or the at least one acoustic information collection device in a low-power Bluetooth mode.

8. The artificial intelligence device of claim 1, further comprising:

a content composition part configured to generate composite content by combining a plurality of partial content items extracted from a plurality of content items, wherein the controller is further configured to retrieve the plurality of content items that correspond to the user-personalized acoustic characteristic, generate the plurality of partial content items by extracting portions that correspond to the at least one user-personalized acoustic characteristic for the plurality of content items, respectively, and control the content composition part to generate the composite content by combining the plurality of partial content items generated by the controller.

9. The artificial intelligence device of claim 8, wherein the controller is further configured to modify at least some of the plurality of partial content items according to the at least one user-personalized acoustic characteristic to generate modified content items, and control the content composition part to generate composite content including the modified content items.

10. The artificial intelligence device of claim 1, wherein the controller is further configured to receive, when there are a plurality of devices collecting specific biometric information, the specific biometric information from any one of the plurality of devices based on a preset condition, and wherein the preset condition is based on at least one of the situation of the user estimated by the artificial intelligence part and a biometric information collection accuracy of one or more of the plurality of devices collecting the specific biometric information.

11. The artificial intelligence device of claim 1, wherein the content includes audio sounds or video.

12. An artificial intelligence device comprising:

a communicator configured to communicate with an output device, a content source, at least one biometric information collection device that collects biometric information of a user, and at least one acoustic information collection device that collects acoustic information around the user;

an artificial intelligence part configured to:

estimate a situation of the user based on the biometric information, detect an effect on the user corresponding to an acoustic environment around the user based on a change in the biometric information, and learn a user-personalized acoustic characteristic corresponding to the situation based on the effect; and a controller configured to:

retrieve at least one content item from the content source based on the user-personalized acoustic characteristic, and control the output device to output the at least one content item, wherein the controller is further configured to:

detect, prior to receiving the biometric information or the collected acoustic information through the communicator, one or more devices to which an artificial intelligence algorithm is applied from among the at least one biometric information collection device and the at least one acoustic information collection device, and exchange data related to artificial intelligence algorithm processing to be carried out by each of the one or more devices, and wherein the data exchanged between the artificial intelligence device and the one or more devices includes information related to one or more variables involved with the artificial intelligence algorithm processing.

13. The artificial intelligence device of claim 12, wherein the information related to the one or more variables includes information on the one or more variables and a processing time corresponding to an artificial intelligence algorithm applied to each of the one or more devices and the artificial intelligence device for processing each of the one or more variables, and wherein the controller is further configured to select a processing entity from among the one or more devices and the artificial intelligence device to process the one or more variables based on the information related to the one or more variables.

14. The artificial intelligence device of claim 12, wherein the data exchanged between the artificial intelligence device and the one or more devices includes service authority information on an authority to use data provided by any one of the artificial intelligence device and the one or more devices.

15. The artificial intelligence device of claim 12, wherein the controller is further configured to:

estimate a situation of the user at a first time based on one or more of the biometric information and the acoustic information;

as a result of the effect detection, if the effect is positive for the user, learn, a user-personalized characteristic of the acoustic information for the situation estimated by the controller; and if the user encounters the situation again at a second time subsequent to the first time, retrieve content corresponding to the user-personalized characteristic learned for the situation and transmit the content to an output device for outputting the content.

16. A method of controlling an artificial intelligence device, the method comprising:

collecting, by a controller of the artificial intelligence device, biometric information of a user from at least one biometric information collection device;

estimating, by the controller, a situation of the user based on the biometric information;

retrieving, by the controller, content from a content source that corresponds to a user-personalized acoustic characteristic previously learned for the situation;

transmitting, by the controller, the content to an output device for outputting the content;

detecting, by the controller, an effect on the user corresponding to an acoustic environment around the user based on a change in the biometric information;

determining, by the controller, whether the effect is a positive effect or a negative effect based on whether the change in the biometric information corresponds to the situation estimated by the controller;

learning, by the controller, the user-personalized acoustic characteristic by reflecting an acoustic characteristic of the content according to a result of the determining whether the effect is the positive effect or the negative effect; and retrieving, by the controller, new content having a same acoustic characteristic as the content or a different characteristic than the content from the content source according to the result of the determining whether the effect is the positive effect or the negative effect, wherein the collecting includes:

detecting a device to which an artificial intelligence algorithm is applied from among the at least one biometric information collection device;

receiving data related to artificial intelligence algorithm processing of the device;

acquiring information including variables for processing the artificial intelligence algorithm applied to the device and variable processing times corresponding to processing times of the variables by the device based on the data, and selecting a processing entity from among the artificial intelligence device and the device for each of the variables based on the information;

processing variables to be processed by the artificial intelligence device based on the information, and providing variable information on the processed variables to the device; and collecting, by the device, the biometric information based on an artificial intelligence algorithm according to the variable information, and transmitting the biometric information to the artificial intelligence device.

17. The method of claim 16, wherein the learning includes:

collecting collected acoustic information from at least one acoustic information collection device that collects acoustic information from around the user;

analyzing at least one acoustic characteristic that is common to the collected acoustic information; and determining the effect of the acoustic environment around the user based on the change in the biometric information, and learning the at least one acoustic characteristic when the effect is determined to be the positive effect.

18. The method of claim 17, wherein the acquiring the information including the variables for the processing includes:

detecting detected variables able to be processed by the artificial intelligence device from among variables used for processing the artificial intelligence algorithm applied to the device;

calculating an expected processing time of the artificial intelligence device for each of the detected variables; and selecting a processing entity from among the artificial intelligence and the device to process each of the detected variables based on the expected processing time of the artificial intelligence device for each of the detected variables.

19. The method of claim 16, wherein the content includes audio sounds or video.

* * * * *